US009742682B2

(12) United States Patent
Jain et al.

(10) Patent No.: US 9,742,682 B2
(45) Date of Patent: Aug. 22, 2017

(54) LARGE RECEIVE OFFLOAD FOR VIRTUAL MACHINES

(71) Applicant: VMware, Inc., Palo Alto, CA (US)

(72) Inventors: Jayant Jain, Cupertino, CA (US); Anirban Sengupta, Saratoga, CA (US); Weiqing Wu, Cupertino, CA (US)

(73) Assignee: VMware, INC., Palo Alto, CA (US)

( * ) Notice: Subject to any disclaimer, the term of this patent is extended or adjusted under 35 U.S.C. 154(b) by 0 days.

(21) Appl. No.: 14/205,121

(22) Filed: Mar. 11, 2014

(65) Prior Publication Data
US 2015/0263974 A1    Sep. 17, 2015

(51) Int. Cl.
*H04L 12/863* (2013.01)
*H04L 12/805* (2013.01)
*H04L 12/911* (2013.01)

(52) U.S. Cl.
CPC ............ *H04L 47/621* (2013.01); *H04L 47/36* (2013.01); *H04L 47/82* (2013.01)

(58) Field of Classification Search
None
See application file for complete search history.

(56) References Cited

U.S. PATENT DOCUMENTS

| | | | |
|---|---|---|---|
| 6,047,323 A | 4/2000 | Krause | |
| 6,496,935 B1 | 12/2002 | Fink et al. | |
| 7,079,544 B2 | 7/2006 | Wakayama et al. | |
| 7,606,260 B2 | 10/2009 | Oguchi et al. | |
| 8,306,062 B1 | 11/2012 | Cohen | |
| 8,341,286 B1 | 12/2012 | Craft et al. | |
| 8,462,632 B1 | 6/2013 | Vincent | |
| 8,825,900 B1 | 9/2014 | Gross, IV et al. | |
| 8,856,518 B2 | 10/2014 | Sridharan et al. | |
| 8,990,422 B1 | 3/2015 | Usmani et al. | |
| 9,225,661 B1* | 12/2015 | Yang | G06F 9/5077 |
| 9,288,135 B2* | 3/2016 | DeCusatis | H04L 45/14 |
| 2001/0007128 A1* | 7/2001 | Lambert | G06F 21/335 |
| | | | 713/165 |
| 2005/0053079 A1 | 3/2005 | Havala | |
| 2006/0029056 A1 | 2/2006 | Perera et al. | |
| 2006/0206655 A1 | 9/2006 | Chappell et al. | |
| 2007/0014246 A1 | 1/2007 | Aloni et al. | |
| 2007/0022212 A1 | 1/2007 | Fan | |
| 2007/0255866 A1* | 11/2007 | Aloni | H04L 69/16 |
| | | | 710/52 |

(Continued)

OTHER PUBLICATIONS

U.S. Appl. No. 14/205,143, filed Mar. 11, 2014, Jain, Jayant, et al.

(Continued)

*Primary Examiner* — Brian D Nguyen
*Assistant Examiner* — Hashim Bhatti
(74) *Attorney, Agent, or Firm* — SU IP Consulting

(57) ABSTRACT

A network interface controller (NIC) that includes a set of receive NIC queues capable of performing large receive offload (LRO) operations by aggregating incoming receive packets is provided. Each NIC queue turns on or off its LRO operation based a set of LRO enabling rules or parameters, whereby only packets that meet the set of rules or parameters will be aggregated in the NIC queue. Each NIC queue is controlled by its own set of LRO enabling rules such that the LRO operations of the different NIC queues can be individually controlled.

28 Claims, 22 Drawing Sheets

(56) References Cited

U.S. PATENT DOCUMENTS

| | | | |
|---|---|---|---|
| 2007/0280243 A1* | 12/2007 | Wray | H04L 12/4633 |
| | | | 370/392 |
| 2008/0019274 A1 | 1/2008 | Droux et al. | |
| 2008/0267177 A1 | 10/2008 | Johnson et al. | |
| 2008/0310420 A1 | 12/2008 | Aloni et al. | |
| 2009/0161547 A1 | 6/2009 | Riddle et al. | |
| 2010/0165874 A1 | 7/2010 | Brown et al. | |
| 2010/0275199 A1 | 10/2010 | Smith et al. | |
| 2010/0287304 A1 | 11/2010 | Chanda | |
| 2010/0322265 A1* | 12/2010 | Gopinath | H04L 49/901 |
| | | | 370/417 |
| 2011/0023029 A1 | 1/2011 | Diab et al. | |
| 2012/0002535 A1 | 1/2012 | Droux et al. | |
| 2012/0079478 A1* | 3/2012 | Galles | H04L 47/2441 |
| | | | 718/1 |
| 2012/0250512 A1* | 10/2012 | Jagadeeswaran | H04L 47/12 |
| | | | 370/235.1 |
| 2012/0250530 A1 | 10/2012 | Jagadeeswaran et al. | |
| 2013/0019042 A1* | 1/2013 | Ertugay | G06F 13/385 |
| | | | 710/267 |
| 2013/0033993 A1 | 2/2013 | Cardona et al. | |
| 2013/0100960 A1 | 4/2013 | Tsirkin et al. | |
| 2013/0259036 A1 | 10/2013 | Tamir et al. | |
| 2014/0056151 A1 | 2/2014 | Petrus et al. | |
| 2014/0115578 A1 | 4/2014 | Cooper et al. | |
| 2014/0157265 A1 | 6/2014 | Alanis et al. | |
| 2014/0157267 A1* | 6/2014 | Alanis | G06F 9/45558 |
| | | | 718/1 |
| 2014/0233588 A1 | 8/2014 | Chudgar et al. | |
| 2014/0280442 A1* | 9/2014 | Jiang | H04L 67/1097 |
| | | | 709/201 |
| 2015/0019748 A1 | 1/2015 | Gross, IV et al. | |
| 2015/0055468 A1* | 2/2015 | Agarwal | H04L 49/9047 |
| | | | 370/232 |
| 2015/0081948 A1* | 3/2015 | Thereska | G06F 3/061 |
| | | | 711/103 |
| 2015/0261556 A1 | 9/2015 | Jain et al. | |
| 2015/0263962 A1 | 9/2015 | Cakmak et al. | |

OTHER PUBLICATIONS

U.S. Appl. No. 14/205,173, filed Mar. 11, 2014, Jain, Jayant, et al.
Anwer, Muhammad Bilal, et al., "Building a Fast, Virtualized Data Plane with Programmable Hardware," Aug. 17, 2009, pp. 1-8, VISA'09, ACM, Barcelona, Spain.
Author Unknown, "Network Functions Virtualisation; Infrastructure Architecture; Architecture of the Hypervisor Domain," Draft ETSI GS NFV-INF 004 V0.3.1, May 28, 2014, pp. 1-50, France.
Koponen, Teemu, et al., "Network Virtualization in Multi-tenant Datacenters," Aug. 2013, pp. 1-22, VMware, Inc., Palo Alto, California, USA.
Le Vasseur, Joshua, et al., "Standardized but Flexible I/O for Self-Virtualizing Devices," Month Unknown, 2008, pp. 1-7.
Peterson, Larry L., et al., "OS Support for General-Purpose Routers," 6 pages, Department of Computer Science, Princeton University, Princeton, New Jersey, USA.
Pettit, Justin, et al., "Virtual Switching in an Era of Advanced Edges," Sep. 2010, pp. 1-7, USA.
Spalink, Tammo, et al., "Building a Robust Software-Based Router Using Network Processors," Month Unknown, 2001, pp. 216-229, ACM, Banff, Canada.
Turner, Jon, et al., "Supercharging PlanetLab—A High Performance, Multi-Application Overlay Network Platform," SIGCOMM-07, Aug. 27-31, 2007, 12 pages, ACM, Koyoto, Japan.
Portions of prosecution history of U.S. Appl. No. 14/205,143, Sep. 11, 2015, VMware, Inc.
Portions of prosecution history of U.S. Appl. No. 14/205,173, Sep. 8, 2015, VMware, Inc.

* cited by examiner

LARGE RECEIVE OFFLOAD FOR VIRTUAL MACHINES

BACKGROUND

Large Receive Offload (LRO) has become a feature on almost all network adapters or network interface controllers (NICs). This feature is typically turned on for end nodes terminating TCP traffic in order to get a boost in throughput to the application terminating the connection on that node. However, blindly forwarding a large, LRO aggregated packet would require downstream fragmentation of packets, leading to performance degradation. Furthermore, traffic being forwarded out of a host machine must comply with Maximum Segment Size (MSS), but MSS is a parameter that is visible only on the TCP layer and not available to a forwarding VM. Performing LRO aggregation on forwarded traffic would therefore likely to create oversized packets that exceed the MSS requirement and results in fragmentation.

In most NICs, LRO is a Boolean feature that is simply turned on or off. However, a host machine in a network virtualization environment can host one or more virtual machines (VMs), some of which may be forwarding traffic rather than terminating traffic. In some host machines, a VM may terminate some types of traffic while forwarding other types of traffic. In order to avoid fragmentation of packets on forwarded traffic, many host machines in network virtualization environment simply elect to turn off the LRO feature in the NIC.

What is needed is a host machine that is able to fully utilize the LRO capability of its NIC for maximizing throughput and performance. Such a host machine should be able to enable LRO aggregation on traffic being terminated by a VM while disabling LRO aggregation on traffic being forwarded by a VM. Such a host machine should also be able to maximize throughput even on forwarded traffic by LRO aggregation without causing unnecessary fragmentation downstream by violating the MSS requirement.

SUMMARY

Some embodiments of the invention provide a network interface controller (NIC) that includes a set of receive NIC queues capable of performing large receive offload (LRO) operations by aggregating incoming receive packets. In some embodiments, each NIC queue turns on or off its LRO operation based a set of LRO enabling rules or parameters, whereby only packets that meet the set of rules or parameters will be aggregated in the NIC queue. In some embodiments, each NIC queue is controlled by its own LRO enabling rule such that the LRO operations of the different NIC queues can be individually controlled.

In some embodiments, the NIC described above is a physical NIC (PNIC). The PNIC has several receive NIC queues, each NIC queue controlled by its own set of LRO enabling rules such that the LRO operations of the different NIC queues can be individually controlled. In some embodiments, at least some of the operations of the PNIC are controlled by a PNIC driver, which in turn provides an application programming interface (API) to the virtualization software for controlling the LRO operations and other PNIC operations. The API allows the virtualization software and other software components of the host machine to set the LRO enabling rules of the individual NIC queues in the PNIC.

In some embodiments, a LRO rule for a NIC queue is a destination address filter that enables LRO operation for a specific destination address (MAC address, IP address, or other types of destination address). In some embodiments, the LRO rule for a NIC queue specifies a particular "flow" or "microflow" for which the LRO operation is to be enabled. In some of these embodiments, the flow is specified by a set of parameters that specifies a network session or a transport connection (e.g., the five-tuple parameters of a TCP/IP connection).

Some embodiments perform LRO aggregation on packets being forwarded by a VM. Some of these embodiments segment the LRO aggregated packet according to the Maximum Segment Size (MSS) of the TCP protocol before forwarding the segmented packets to their destination. Some embodiments snoop the packets being forwarded for its MSS parameter before using the snooped MSS parameter to perform Transmit Segmentation Offload (TSO) operation. In some embodiments, the segmentation operation that uses the extracted MSS parameter is performed by a PNIC of the host machine. In some of these embodiments, the PNIC performs both the aggregation operation (LRO) and the segmentation (TSO) within its own hardware without consuming CPU cycles at the host machine. In some embodiments, the PNIC receives the MSS parameter from the network stack as a metadata that accompanies a LRO aggregated packet.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a network interface controller (NIC) that includes a set of receive NIC queues capable of performing large receive offload (LRO) operations by aggregating incoming receive packets. In some embodiments, each NIC queue turns on or off its LRO operation based a set of LRO enabling rules or parameters, whereby only packets that meet the set of rules or parameters will be aggregated in the NIC queue. In some embodiments, each NIC queue is controlled by its own LRO enabling rule such that the LRO operations of the different NIC queues can be individually controlled.

In some embodiments, LRO is turned on or off in the hardware or software based upon flow information programmed on the component performing the LRO aggregation. The flow or micro flow could be L2 or L3-L4 flow with wildcards. Hence for example, some embodiments enable LRO for all traffic destined to a particular VM's MAC address. This way the VM and virtualization software can gain in efficiency and throughput as this reduces the number of packets hitting through the VM.

Figure 1:
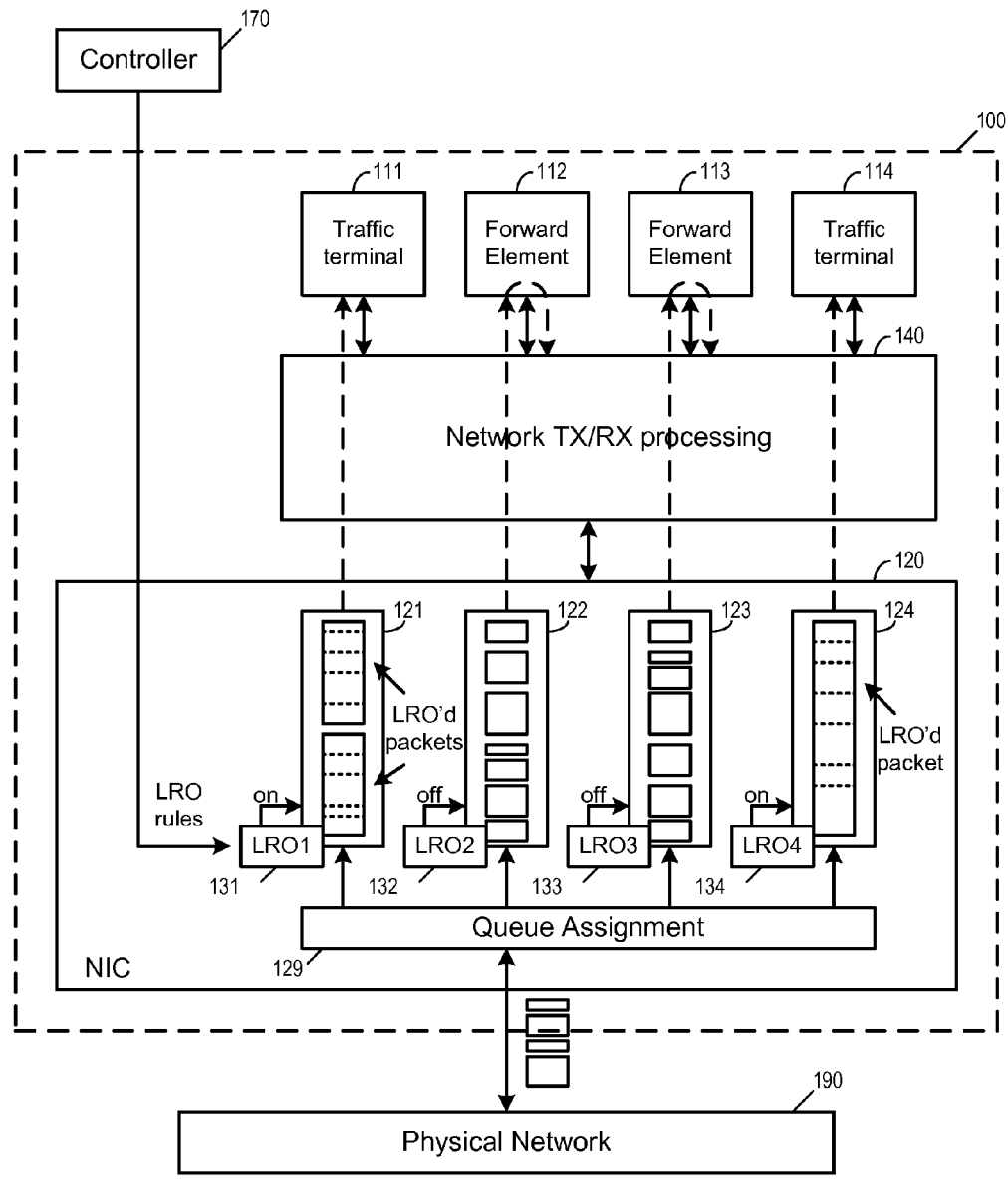
FIG. 1 illustrates a NIC having NIC queues whose LRO operations can be individually enabled or disabled.

FIG. 1 illustrates a NIC 120 having NIC queues 121-124 whose LRO operations can be individually enabled or disabled. The NIC 120 is part of a host machine 100 in a network virtualization environment. The host machine 100 is communicatively linked to other network nodes through to a physical network 190 and hosting virtual machines (VMs) 111-114. The host machine also provides network transmit/receive processing 140 between the NIC 120 and the VMs 111-114.

The host machine 100, in some embodiments, is a computing device managed by an operating system (e.g., Linux) that is capable of creating and hosting VMs. The host machine provides the computing resources (such as CPU cores and memories) needed for performing the computing tasks of the VMs. The host machine also provides the network communication resources needed for allowing each VM to participate in the network traffic of the physical network 190.

The VMs 111-114 are virtual machines operating in the host machine 100. The VMs executes on top of a hypervisor (not shown), which, in some embodiments, includes the network virtualization layer. Network virtualization will be further described by reference to FIG. 3 below. In some embodiments, the VMs 111-114 are each assigned a set of network addresses (e.g., a MAC address for L2, an IP address for L3, etc.) and can send and receive network data to and from other network elements, such as other VMs. In some embodiments, at least some of the VMs act as traffic terminals of network traffic that generates or consume network traffic. In some embodiments, at least some of the VMs act as forwarding elements of network traffic that forward received data packets on to other elements in the network. In the example host machine illustrated in FIG. 1, the VMs 112 and 113 are operating as forwarding elements, while the VMs 111 and 114 are operating as network traffic terminals.

In some embodiments, a forwarding VM both forwards and consumes (i.e., uses) the network traffic that it receives. In some embodiments, a forwarding VM replicates the received network traffic to multiple recipients. In some embodiments, a forwarding VM does not use or consume the network traffic that it receives and just forwards. In some of these embodiments, the host machine is operating a multi-layered network stack for each VM, and a forwarding VM performs packet forwarding at lower levels of the network stack (e.g. below TCP level). In some embodiments, a forwarding VM is an instance of a logical routing element (LRE) that performs L3 routing between different IP subnets. Description of LREs can be found in U.S. patent application Ser. No. 14/137,862.

The host machine 100 performs various functions and operations between the NIC 120 and the VMs 111-114. These functions and operations are collectively referred to as the network TX and RX processing 140 in FIG. 1. Different embodiments implement the TX and RX process 140 differently. Some embodiments implement the network TX and RX processing 140 as one module within the host machine 100, while some other embodiments implement the network TX and RX processing 140 in several modules.

In some embodiments, the TX and RX processing 140 includes network stacks for the VMs 111-114. In some embodiments, at least some of the network stacks are implemented according to a multi-layer networking model such as TCP/IP. In some embodiments, each of the network stacks includes an I/O chain (not illustrated) that performs the layered network operations as well as other operations. Network stacks will be further described by reference to FIGS. 4-5 below.

In some embodiments, the TX and RX processing 140 includes L2 switching operations and/or L3 routing operations. In some of these embodiments, these switching and/or routing operations are performed by an instance or instances of software forwarding elements such as logical forwarding elements (LFEs), logical switching elements (LSEs), or the aforementioned LREs. Software forwarding elements will be further described by reference to FIG. 4.

The NIC module 120 is the interface to the physical network 190 for the host machine 100. As illustrated, the NIC module 120 includes a number of queues 121-124 for queuing incoming network traffic packets from the physical network 190. The NIC module also includes a queue assignment sub-module 129 for assigning incoming data packets to the queues 121-124. In some embodiments, each of the NIC queues is assigned to a computing resource (e.g., processor core or a processing thread) in the host machine 100, and the queue assignment sub-module 129 assigns incoming packet to the queues according to the computing resource assignment. In some embodiments, each of the NIC queues is associated with a VM. In some of these embodiments, each VM is addressable by a MAC address or IP address, and the queue assignment sub-module 129 filters incoming network packets into the queues based on the MAC address or the IP address of the VMs.

As illustrated, the NIC queues 121-124 are associated with the VMs 111-114, respectively. In some embodiments, a VM is associated with a NIC queue because the NIC queue receives only data packet filtered for that VM. In some embodiments, a VM is associated with a NIC queue because the NIC queue is assigned to a processor core or a CPU that is running the network stack or the processing threads of the VM. In some embodiments, a NIC queue is not associated with any particular VM, but received data packets will be distributed to their correct destination VMs according to their destination IP address or MAC address.

The NIC queues 121-124 are for buffering incoming data packets received from the physical network 190. Furthermore, each of the NIC queues 121-124 is capable of performing LRO operations, i.e., aggregating smaller incoming network packets into larger data packets for efficient processing and delivery to the VMs. The LRO operations of each NIC is individually controlled by a LRO rule or a set of LRO rules for that NIC queue, and the NIC queue enables LRO operations on packets that comply with the LRO rule for that queue (i.e., aggregates a smaller data packet in the NIC queue into a aggregated LRO packet when the smaller data packet meets the criteria set forth by the LRO rule). In some embodiments, such rules are supplied by a network controller 170 that controls the networking operations of the host machines (include 100) that are connected to the physical network 190.

In some embodiments, a LRO rule for a NIC queue is a destination address filter that enables LRO operation for a specific destination address (MAC address, IP address, or other types of destination address). In some embodiments, the LRO rule for a NIC queue specifies a particular "flow" or "microflow" for which the LRO operation is to be enabled. In some of these embodiments, the flow is specified by a set of parameters that specifies a network session or a transport connection (e.g., the five-tuple parameters of a TCP/IP connection). In other words, the LRO rule specifies that packet aggregation is to be turned on for data packets of a particular network session or connection but not for others. Flow-based LRO control will be further described in Section II below.

As mentioned, in some embodiments, the LRO operations of the different NIC queues are individually enabled or disabled. In other words, LRO operations can be enabled for some NIC queues while disabled for others. FIG. 1 illustrates the individual enable/disable of the LRO operations in queues 121-124 of the NIC 120. In the NIC 120, the LRO operations of the NIC queue 121-124 are controlled by LRO control modules 131-134, respectively. As illustrated, the LRO control 131 receives a LRO rule that enables LRO aggregation in the NIC queue 121, while the LRO control 132 receives a different LRO rule that disables LRO aggregation in the NIC queue 122. The NIC queues 123 and 124 are likewise respectively disabled and enabled by each's own LRO controls 133 and 134. As mentioned, some embodiments enable LRO aggregation for a particular destination VM, hence all packets in the NIC queue of the particular destination VM will be aggregated by LRO operation. For some embodiments that enable LRO for a particular flow (e.g., a TCP connection), only packets in the NIC queue that belongs to that particular flow will be aggregated.

By allowing the LRO operations of NIC queues to be individually enabled or disabled, the host machine in some embodiments allows effective control of LRO operations for different VMs. For example, in some embodiments, it is desirable to turn on LRO operations for traffic terminating at a VM while turning off LRO operations for traffic that are to be forwarded. This is at least partly because packets that are to be forwarded out of the host machine must comply with a maximum size requirement, and hence it is desirable to turn off LRO operations for those VMs (e.g., VMs 112 and 113) that are forwarding packets out of the host machine. This avoids creating LRO aggregated packets that may exceed the maximum size limit (e.g., Ethernet MTU), which require downstream segmentation operations (e.g., TSO operations) or fragmentation to dissolve the aggregated packets into smaller segments or fragments. On the other hand, for VMs that consume the incoming network packets and do not forward those packets (e.g., the VMs 111 and 114), it is advantageous to perform LRO aggregation for reducing overhead, because LRO aggregated packets that exceed the maximum size requirement of the physical network would not need to be segmented or fragmented later. Some embodiments allow further effective control of the LRO operations by enabling and disabling LRO operations in each NIC queue on a connection by connection, or session by session basis.

Figure 2:
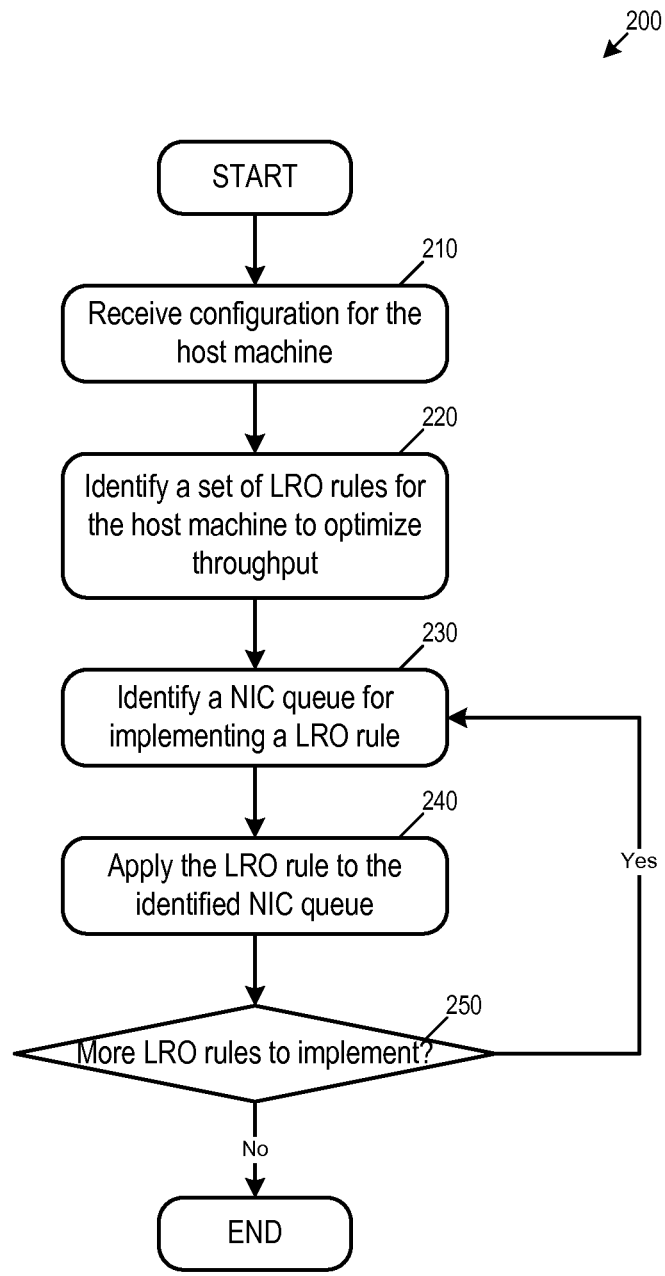
FIG. 2 conceptually illustrates a process for setting LRO rules to NIC queues individually.

FIG. 2 conceptually illustrates a process 200 for setting LRO rules to NIC queues individually. The process 200 starts when it receives (at 210) a configuration for the host machine. In some embodiments, such a configuration specifies the VMs that will be running on the host machine. In some embodiments that operate a virtualization software in the host machine, such configuration also specifies parameters for components of the virtualization software such as software switches and/or software routers.

The process then identifies (at 220) a set of LRO rules for the host machine. In some embodiment, such LRO rules are identified in order to optimize the performance of the host machine. For example, some embodiments set the LRO rules so that packets that will be consumed by a VM within the host machine will be aggregated while packets that will be forwarded by a VM would not be aggregated. This is done to minimize overhead in processing small packets and to avoid having to segment or fragment oversized packet. Some embodiments identify transport connections that are forwarded or consumed by VMs in the host machine. The process then enables LRO aggregation for transport connections that terminate at VMs in this host machine while disable LRO aggregation for transport connections that are to be forwarded by VMs in this host machine.

Next, the process identifies (at 230) NIC queues that are needed for implementing those LRO rules. In some embodiments, an LRO rule can be for packets destined for a particular VM, so to perform LRO on those packets requires identifying the NIC queues that buffers the packets for that particular VM. In some embodiments, an LRO rule can be for a particular type of packet (e.g., of a particular TCP connection identifiable by a five-tuple), and the process would identify a NIC queue that is assigned to hold that particular type of packets.

Once a NIC queue is identified for a particular LRO rule, the process applies (at 240) the particular LRO rule to the identified NIC queue. In the example of FIG. 1, this operation includes sending the LRO rule to the LRO control module of the identified NIC queue. In some embodiments in which the NIC is a physical NIC (PNIC), the operation includes setting the LRO rules at the queues of the PNIC through the API of the driver of the PNIC.

The process then determines (at 250) if there are other LRO rules to implement in the NIC queues. If so, the process returns to 230 to identify a NIC queue for another LRO rule. If not, the process 200 ends.

The solution described above allows effective turning on of LRO on micro flow level so that traffic destined to a particular VM can have LRO enabled in hardware or software. This allows the virtualization software to efficiently use the resources available to it.

Several more detailed embodiments of the invention are described below. Section I describes individually enabled NIC queues in a physical NIC. Section II describes controlling LRO operations using various LRO aggregation rules. Section III describes snooping maximum segment size parameter from forwarded packets. Finally, section IV describes an electronic system with which some embodiments of the invention are implemented.

I. Individually Controlled LRO in a Physical NIC

In some embodiments, the NIC described above is a physical NIC (PNIC) in a host machine of a virtualized network environment. The PNIC is a network adaptor that has dedicated network interfacing hardware for processing incoming and outgoing network traffic without consuming processor (i.e., CPU) cycles of the host machine. The host machine operates virtualization software, which allows multiple VMs to simultaneously operate in the host machine and to have network access through the PNIC to the physical network. The PNIC has several receive NIC queues, each NIC queue controlled by its own set of LRO enabling rules such that the LRO operations of the different NIC queues can be individually controlled. In some embodiments, at least some of the operations of the PNIC are controlled by a PNIC driver, which in turn provides an application programming interface (API) to the virtualization software for controlling the LRO operations and other PNIC operations. The API allows the virtualization software and other software components of the host machine to set the LRO enabling rules of the individual NIC queues in the PNIC.

Figure 3:
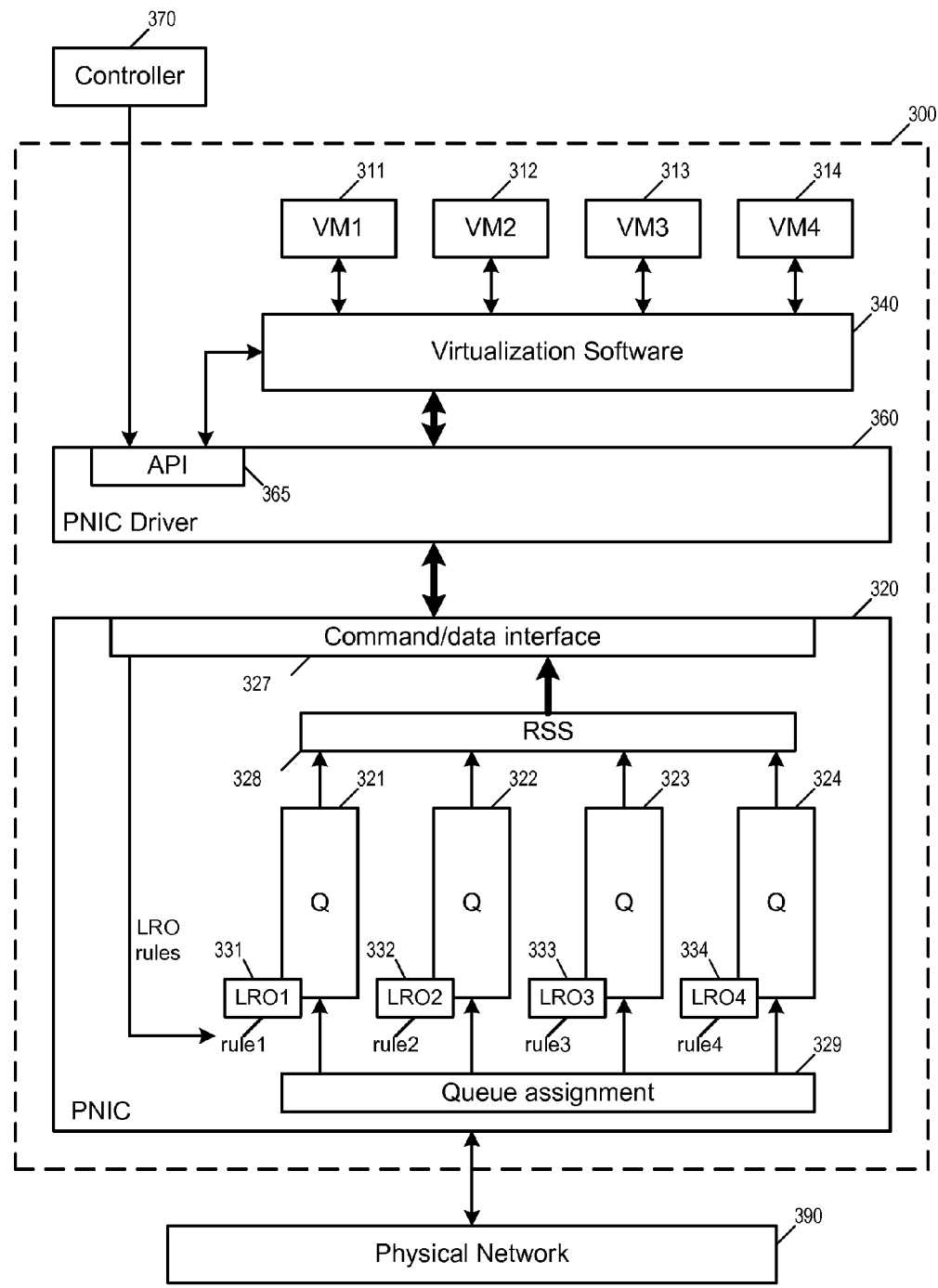
FIG. 3 illustrates a host machine with a PNIC having NIC queues whose LRO operations are controlled by API of the PNIC's driver.

FIG. 3 illustrates a host machine 300 with a PNIC 320 having NIC queues whose LRO operations are controlled by the API of the PNIC's driver. The API makes the control of the individual NIC queues in the PNIC available to virtualization software running in the host machine. As illustrated, the host machine 300 is running virtualization software 340, which allows the host machine 300 to host VMs 311-314. The virtualization software 340 also provides network virtualization to the VMs 311-314, which allows the VMs to send and receive network traffic from the physical network 390 through the PNIC 320. The control of the PNIC 320 is available to the host machine 300 through the PNIC driver 360, which provides API 365 as interface for software components (including the virtualization software 340) running on the host machine 300. In some embodiments, these various software components are program(s) being executed on one or more processors or processor cores in the host machine. The software components running on the host machine invokes API routines of the PNIC driver 360, which cause the driver to issue commands or send data to the PNIC 320, or to retrieve data or handle interrupt from the PNIC 320.

The PNIC 320 is a physical hardware component dedicated to performing the function of a NIC. In some embodiments, the host machine 300 offloads network interfacing tasks from its CPUs/processors to the PNIC 320. As illustrated, the PNIC 320 includes receive queues 321-324 for buffering incoming packets from the physical network 390, each of these queues capable of LRO packet aggregation operations as described above. The LRO operations of each of these queues 321-324 are controlled by its own LRO control module (331-334, respectively). In some embodiments, the queuing of incoming network traffic as well as the aggregating of data packets (LRO) are handled by the PNIC 320 without consuming CPU/processor cycles in the host machine 300. In some of these embodiments, the LRO rules to the different NIC queues are provided by the virtualization software 340 through the API 365, while the PNIC 320 uses the API 365 to inform the virtualization software 340 that a particular NIC queue has completed aggregating a packet under the particular NIC queue's LRO aggregation rule. In some embodiments, the virtualization software in turn fetches the received data packets from the PNIC, either aggregated (if LRO is turned on) or not aggregated (if LRO is turned off). As illustrated, the API 365 also allows LRO operations to be controlled by an external network controller 370, which in some embodiments pushes down configuration or control data that includes rules for LRO aggregation to the host machine 300.

The PNIC 320 also includes a queue assignment sub-module 329 and a RSS (receive side scaling) sub-module 328. The queue assignment sub-module 329 determines to which NIC queue an incoming data packet from the physical network goes into, while the RSS sub-module assigns each NIC queue to a computing resource (e.g., processor core or processing thread) in the host machine. In some embodiments, the RSS 328 assigns network traffic to processing threads, and the threads can be assigned to different CPUs for load balancing purposes. In some of these embodiments, each VM is associated with a processing thread, and the RSS 328 ensures that a thread of a VM stays on a CPU for the duration of a network connection session. In some embodiments, the queue assignment sub-module 329 assigns packets to the different queues by simply hashing the incoming packets (e.g., by hashing on the destination MAC address or IP address), the RSS 328 sub-module in turn distributes packets from the NIC queues based on the same hashing function.

In some embodiments, each of the NIC queues 321-324 is directly associated with a VM, and the queue assignment sub-module 329 filters incoming network packets into the queues based on the MAC address or the IP address of the VMs. In some embodiments, a NIC queue in the PNIC 320 is not associated with any particular VM, but the received data packets will be distributed to their correct destination VMs according to their destination IP address or destination MAC address by a software forwarding element. In some embodiments, the queue assignment sub-module 329 filters incoming network packets into the queues based on flows or micro-flows that are associated with connection sessions. For example, a NIC queue can have a filter that accepts only packets having a particular five-tuple identifier belonging to a particular TCP connection.

In some embodiments, the queue assignment sub-module 329 assigns packets from multiple different VMs to a same NIC queue. This is the case for some host machines operate more VMs than NIC queues such that at least some of the NIC queues necessarily serve multiple VMs. A host machine that operates more VMs than NIC queues will be further described below by reference to FIG. 8. In some embodiments, the queue assignment sub-module 329 assigns packets for a particular VM to only one particular NIC queue such that all of the packets heading to that particular VM will be subject to a same set of LRO rules being applied to that particular queue. In some embodiments, the queue assignment sub-module 329 can assign packets for a same VM across different queues. This can occur if the queue assignment sub-module uses criteria other than destination address for assigning packets to a queue (e.g., by hashing or by connection session identified by five-tuple). Assigning packets for a same VM across different NIC queues will be further discussed by reference to FIG. 9 below.

As discussed above, different embodiments assign incoming packets to queues based on different types of criteria (MAC address, five-tuple, simple hashing, etc.). In some embodiments, different queues in a NIC can be programmed to accept packets based on different types of criteria, i.e., a NIC can use a mixture of types of criteria for assigning packets into queues. For example, in some embodiments, a NIC can have some queues that use MAC filters for accepting incoming packets, some queues that use connection/five-tuple filters, while other queues receive packets solely based on a hashing function.

Though not illustrated, a PNIC in some embodiments have different types of NIC queues, in which some of the NIC queues are assigned to computing resources, while others are assigned to corresponding destination VMs by setting MAC filters. In some embodiments, some of the queues in the PNIC are dedicated to specialized hardware functions. For example, some of the NIC queues have specialized hardware support for performing LRO operations, and can be programmed to perform LRO aggregation for any destination VM.

The PNIC 320 also includes a command/data interface 327 for handling the communication between the PNIC 320 and the processor core of the host machine 300. The PNIC driver 360 communicates with the PNIC 320 when routines of the API 365 are invoked at the processor core of the host machine 300 (e.g., by the virtualization software 340). The command/data interface 327 translates signals received from the process core into data packets for the network, or into control signals for various components of the PNIC 320. Among these control signals are the LRO aggregation rules for each of the NIC queues 321-324, where different LRO control modules 331-334 are controlled by different control signals from the command/data interface 327. In some embodiments, the processor is able to implement a LRO aggregation rules at a particular NIC queues by invoking an API routine that addresses the control signals of a particular LRO control module.

In some embodiments, the command/data interface 327 also support communication with the driver 360 by interrupt or by polling. For example, when there is an aggregated packet ready for delivery to one of the VMs from one of the NIC queues 321-324, the command/data interface 327 updates a set of corresponding status bits so the processor would know that there is a packet ready for retrieval when it polls the status bits. The processor then invokes an API routine to retrieve the packet from the PNIC 320 through the command/data interface 327.

The virtualization software 340 manages the VMs 311-314. Virtualization software may include one or more software components and/or layers, possibly including one or more of the software components known in the field of virtual machine technology as virtual machine monitors (VMMs), hypervisors, or virtualization kernels. Because virtualization terminology has evolved over time and has not yet become fully standardized, these terms do not always provide clear distinctions between the software layers and components to which they refer. As used herein, the term, "virtualization software" is intended to generically refer to a software layer or component logically interposed between a virtual machine and the host platform.

In some embodiments, the virtualization software 340 assigns the computing resources of the host machine (e.g., CPU cycles) to the VMs 311-314. In some embodiments, the virtualization software also conducts network traffic between the PNIC 320 and the VMs 311-314 as well as among the VMs 311-314 themselves. In some of these embodiments, the virtualization software includes one or more software forwarding element for forwarding data packets to and from the VMs in the host machine. In addition, the host machine also operates a network stack or protocol stack for each of the VMs. For some of these embodiments, FIG. 4 illustrates the host machine 300 operating a software forwarding element and network stacks between the PNIC 320 and the VMs 311-314.

Figure 4:
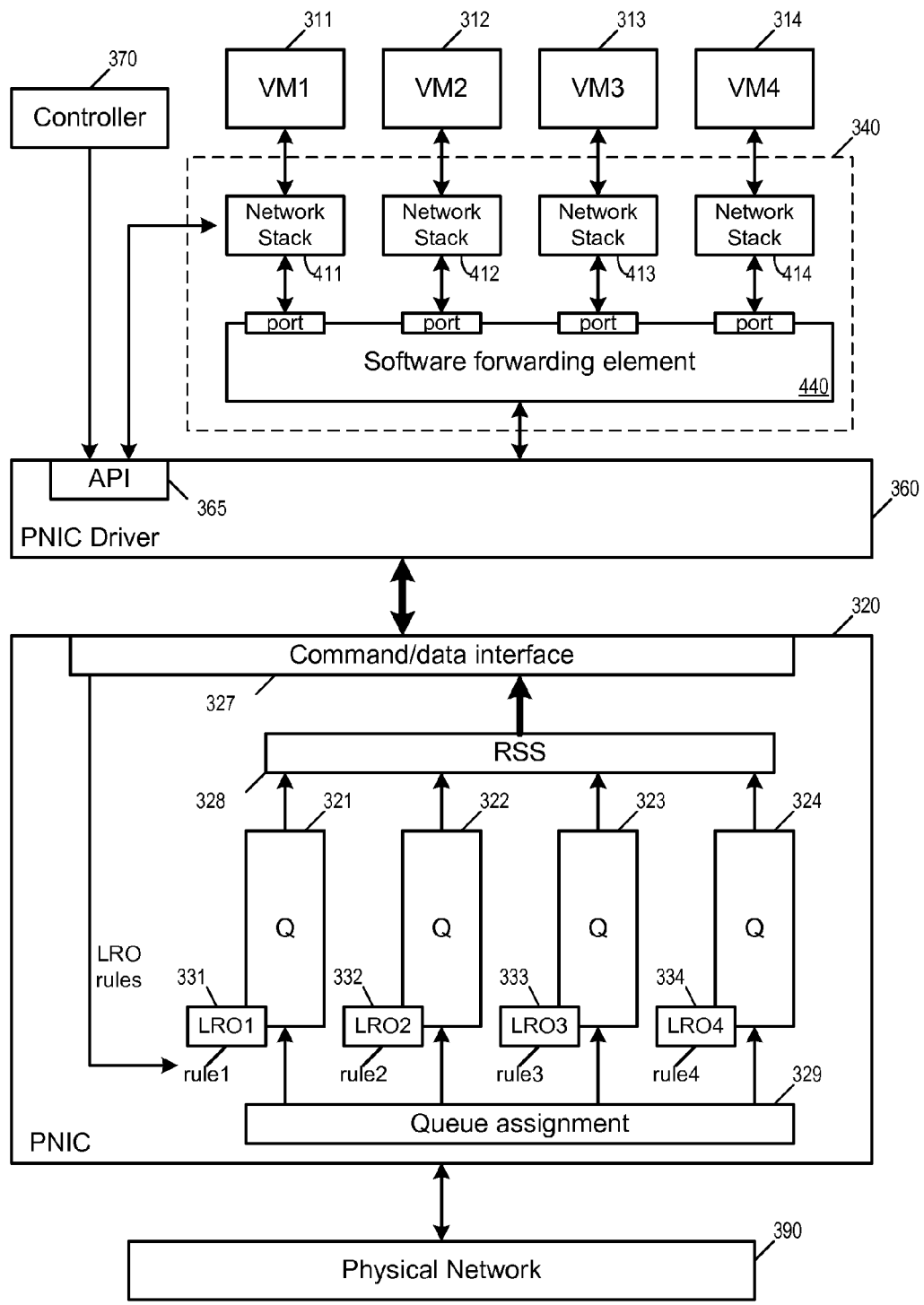
FIG. 4 illustrates a host machine operating a software forwarding element and network stacks between a PNIC and VMs.

As illustrated in FIG. 4, in addition to the PNIC driver 360 and the PNIC 320, the host machine 300 is operating a software forwarding element 440 and network stacks 411-414 for the VMs 311-314. In some embodiments, the software forwarding element 440 and the network stacks 411-414 are part of the virtualization software running on the host machine 300 (e.g., the virtualization software 340). Each network stack connects to its VM and the software forwarding element 440, which is shared by all the network stacks of all the VMs. Each network stack connects to the software forwarding element 440 through a port of the software forwarding element. In some embodiments, the software forwarding element 440 maintains a single port for each VM.

The software forwarding element 440 connects to the PNIC 320 through the PNIC driver 360 to send outgoing packets and to receive incoming packets. In some embodiments, the software forwarding element is defined to include an uplink through which it connects to the PNIC to send and receive packets. The software forwarding element 440 performs packet-processing operations to forward packets that it receives on one of its ports to another one of its ports, or through the uplink and the physical network to another host machine. For example, in some embodiments, the software forwarding element 440 tries to use data in the packet (e.g., data in the packet header) to match a packet to flow based rules, and upon finding a match, performs the action specified by the matching rule.

In some embodiments, software forwarding elements executing on different host devices (e.g., different computers) are configured to implement different logical forwarding elements (LFEs) for different logical networks of different tenants, users, departments, etc. that use the same shared computing and networking resources. For instance, two software forwarding elements executing on two host devices can perform L2 switch functionality. Each of these software switches can in part implement two different logical L2 switches, with each logical L2 switch connecting the VMs of one entity. In some embodiments, the software forwarding elements provide L3 routing functionality, and can be configured to implement different logical routers with the software L3 routers executing on other hosts.

In the virtualization field, some refer to software forwarding elements as virtual forwarding elements as these are software elements. However, in some embodiments, the software forwarding elements are referred to as physical forwarding elements (PFEs), in order to distinguish them from logical forwarding elements (LFEs), which are logical constructs that are not tied to the physical world. In other words, the software forwarding elements are referred to as PFEs because they exist and operate in the physical world, whereas logical forwarding elements are simply a logical representation of a forwarding element that is presented to a user. Examples of software forwarding elements such as software switches, software routers, etc. can be found in U.S. patent application Ser. No. 14/137,862.

Each network stack processes network traffic from the PNIC 320 to its corresponding VM across the different layers of network protocols. In some embodiments, this includes handling network protocols at link layer (e.g., Ethernet or MAC), network layer (e.g., IP), transport layer (e.g., TCP), and/or application layer (e.g., HTTP). In some embodiments, one or more of the layered protocols of a network stack is handled by the corresponding VM.

In some embodiments, an LRO aggregated packet is a TCP layer packet (i.e., having TCP headers and specifying a TCP port as destination). Such an LRO aggregated packet destined for a particular VM is processed at the transport layer of the particular VM's network stack according to the TCP protocol. In some embodiments, the network stack communicates with the PNIC through the PNIC's API in order to retrieve LRO aggregated packets from the NIC queue.

Figure 5:
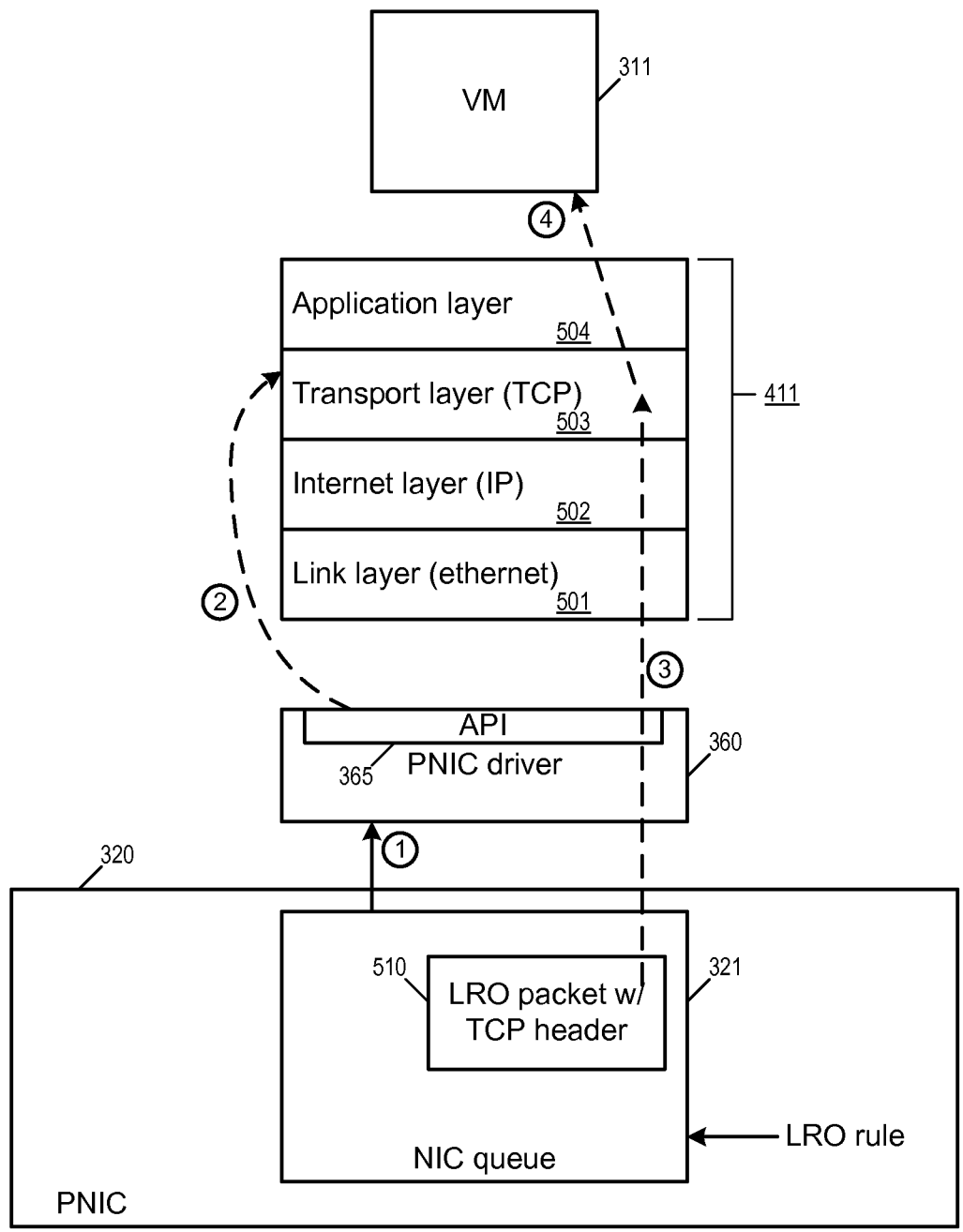
FIG. 5 conceptually illustrates the handling of LRO aggregated packets by a network stack for a VM in a host machine.

FIG. 5 conceptually illustrates the handling of LRO aggregated packets by the network stack 411 for the VM 311 in the host machine 300. The network stack 411 includes a link layer 501, an internet layer 502, a transport layer (TCP) layer 503, and an application layer 504. The network stack communicates with the NIC queue 321 in the PNIC 320 through the API 365 of the PNIC driver 360. The NIC queue 321 has finished aggregating a packet 510 under a LRO rule 590. The aggregated LRO packet 510 has TCP header for processing at TCP layer.

FIG. 5 illustrates the retrieval of a LRO packet through the PNIC's API in four operations labeled '1' through '4'. At the operation labeled '1', the PNIC 320 detects that an LRO aggregated packet is ready for delivery in the NIC queue 321 and sends an interrupt to the processor core, which communicates with the PNIC through the PNIC driver 360 using the PNIC's API 365. At the operation labeled '2', the TCP layer of the network stack picks up the interrupt signal and recognized that there is an LRO packet sitting in the PNIC 320. At the operation labeled '3', the aggregated packet 510 is retrieved from the NIC queue 321 by using the API 365. The packet 510 traverses through lower layers of the network stack 411 (i.e., link layer 501 and IP layer 502) before reaching TCP layer 503. At the operation labeled '4', the TCP layer 503 processes the LRO packet according to TCP protocol and passes the content of the LRO aggregated packet to the application layer 504 and the VM 311.

In some embodiments, each network stack is operated by processing threads running on the host machine's processor core(s). In some of these embodiments, each thread manages a queue in the PNIC 320. Whenever a queue in the PNIC has a packet ready (e.g., a LRO packet) for delivery to the corresponding network stack, the PNIC 320 generates an interrupt to the processor core that executes the network stack's processing thread. The PNIC 320 sends this interrupt through the API 365, which in turn passes the interrupt to the processor core. In some embodiments, each time a queue's thread is invoked for this operation, the core that manages the queue and executes its thread has to interrupt another task that it is performing to execute the thread so that it can retrieve the packets from the queue. Such interruptions affect the processor's operational efficiency. By performing LRO operations and aggregating many small packets into fewer, larger packets, some embodiments increase the operational efficiency of the processor by reducing the number of interrupts that the processor has to handle.

Figure 6:
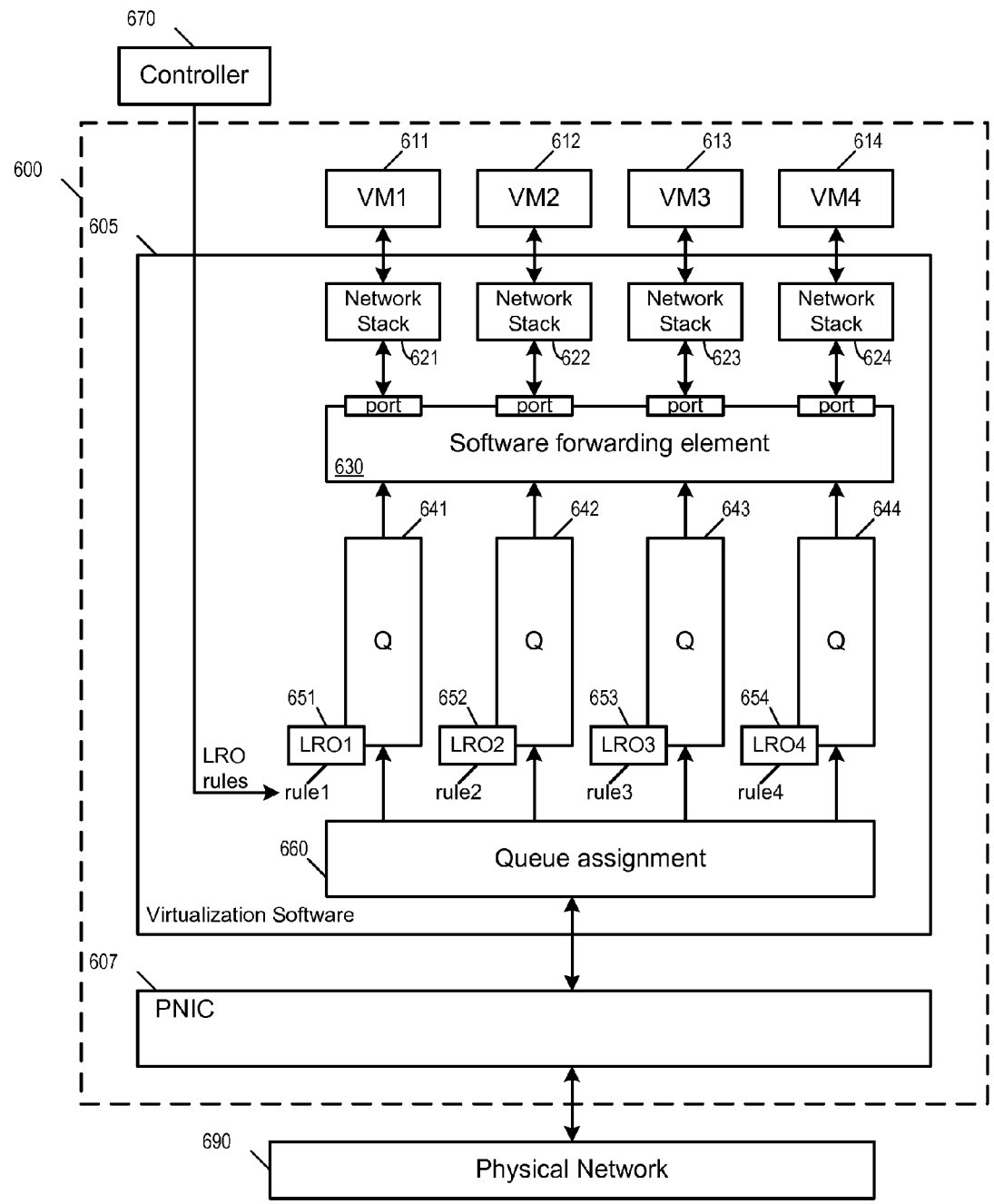
FIG. 6 illustrates a host machine that is running virtualization software that performs LRO aggregation.

In some embodiments, LRO aggregation is not implemented in the PNIC, but is instead implemented within the virtualization software. FIG. 6 illustrates a host machine 600 that is running virtualization software 605 that performs LRO aggregation. The virtualization software 605 is operating VMs 611-614 and receiving data packets from a physical network 690 through a PNIC 607.

The virtualization software 605 includes network stacks 621-624 for the VMs 611-614, respectively. The virtualization software 605 also includes a software forwarding elements 630 for forwarding packets between the PNIC and the VMs. The software forwarding element 630 has several ports, each port of the virtualization software is connected to a network stack (621-624) of a VM (611-614). The software forwarding element 630 receives data packets from the PNIC 607 through a set of queues 641-644. Like the NIC queues in the PNIC as described above by reference to FIGS. 3-5, the queues are for buffering incoming data packets received from the physical network. And like the NIC queues in the PNIC, each queue in the set of queues 641-644 is capable of performing LRO aggregation operation based on its own LRO aggregation rule (651-654). In some embodiments, the LRO aggregation rules are specified by an external network controller 670. The virtualization software 605 also includes a queue assignment module 660 for assigning incoming data packets from the PNIC to the queues 641-644.

Figure 7:
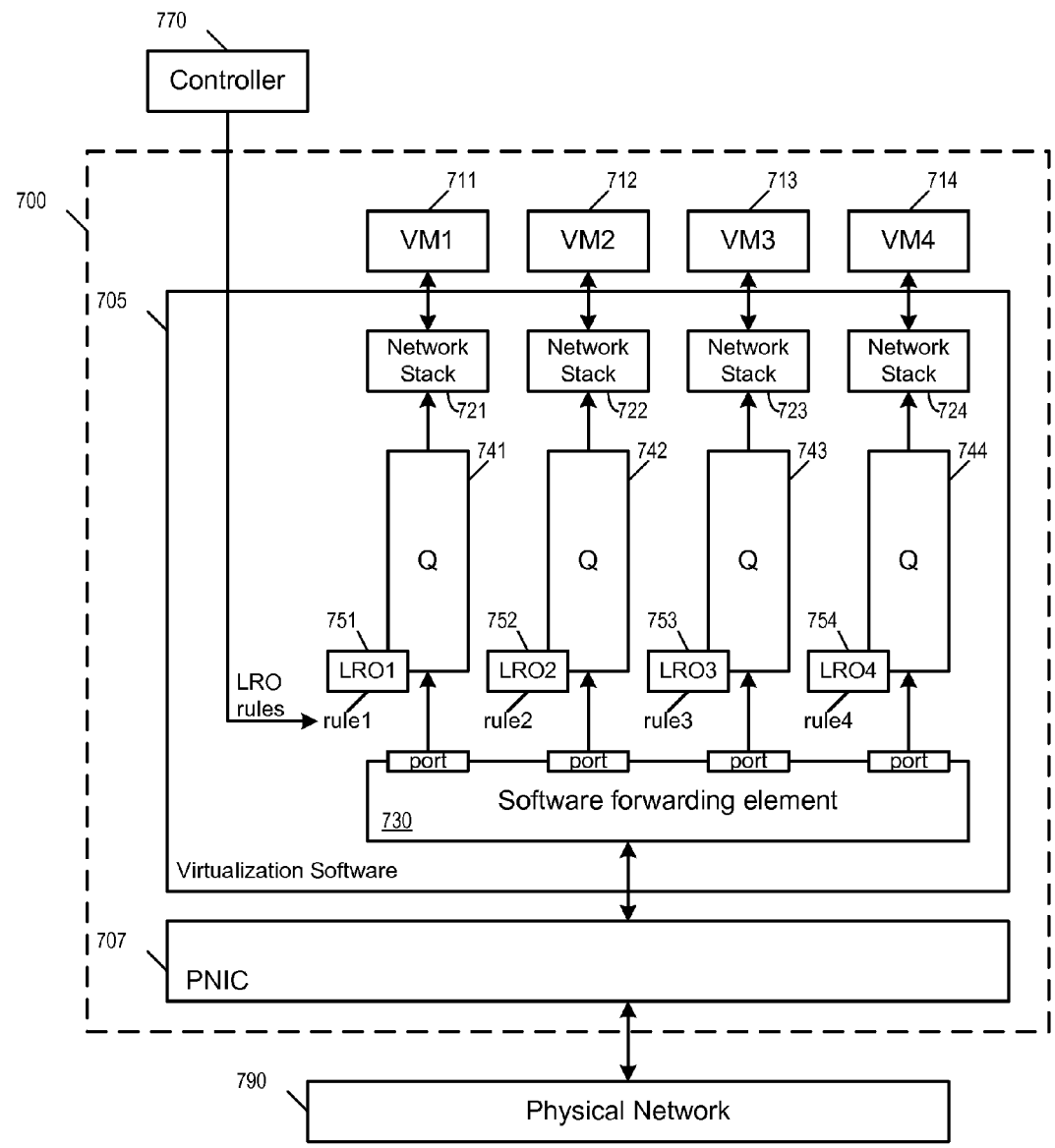
FIG. 7 illustrates a virtualization software in which LRO aggregation takes place after packet forwarding by the software forwarding element.

FIG. 6 illustrates a virtualization software in which the LRO aggregation of packets occurs in the queues 641-644 before packet-forwarding by the software forwarding element 630. In some other embodiments, the virtualization software performs LRO aggregation after packet forwarding by the software forwarding element. In some of these embodiments, each VM has its own dedicated LRO aggregation mechanism that can be turned on or off. FIG. 7 illustrates a virtualization software in which LRO aggregation takes place after packet forwarding by the software forwarding element.

FIG. 7 illustrates a host machine 700 that is running virtualization software 705 that performs LRO aggregation. Like the virtualization software 605, the virtualization software 705 is operating VMs 711-714 and receives data packets from a physical network 790 through a PNIC 707. The virtualization software 705 includes network stacks 721-724 for the VMs 711-714, respectively. The virtualization software 705 also includes a software forwarding elements 730 for forwarding packets between the PNIC 707 and the VMs 711-714. The software forwarding element 730 has several ports, each port of the virtualization software is for forwarding packets to a VM.

Unlike the software forwarding element 630 in the virtualization software 605, the forwarding element 730 does not receives LRO aggregated packets. Rather, each port of the software forwarding element 730 forwards received data packet to a queue that is capable of performing LRO aggregation before reaching a network stack for a VM. As illustrated, the queues 741-744 are situated at the ports of the software forwarding element 730, and are for performing LRO aggregation on packets destined to the VMs 711-714, respectively. The network stacks 721-724 receives data packets from the queues 741-742, and these data packets may be LRO aggregated or not based on the LRO aggregation rule of each of the queues 741-744. Since the LRO capable queues 741-744 receive data packets that are already sorted based on destination address, the virtualization software 705 does not include a queue assignment module (like 660) for assigning receive data packets to those queues.

In some embodiments, some or all of the queues handle data packets (and hence aggregation) for multiple different VMs. This is particularly the case when the host machine implementing the NIC queues is operating fewer NIC queues than VMs. For some embodiments, FIG. 8 illustrates a host machine 800 that assigns packets for different VMs into a same queue.

Figure 8:
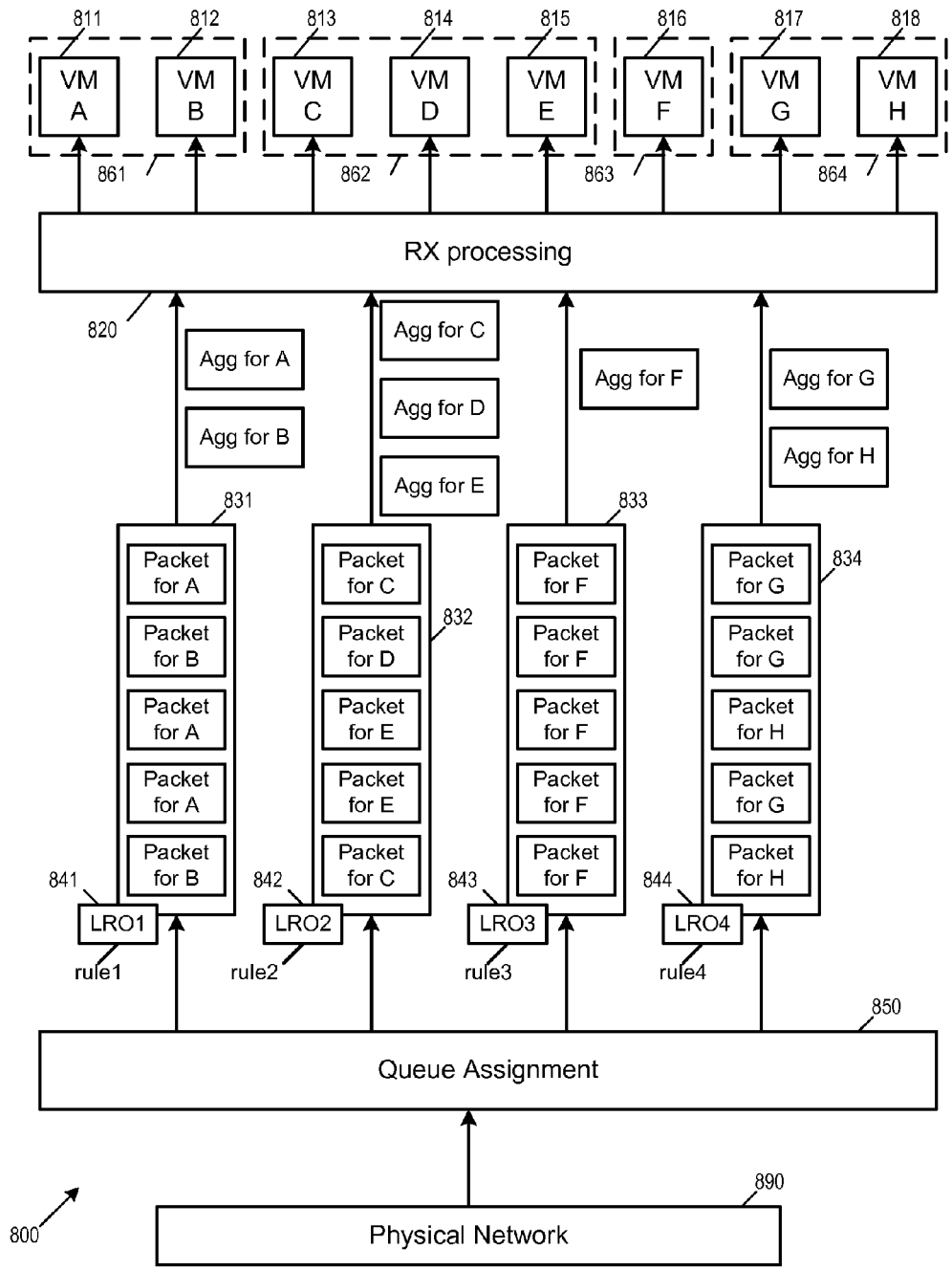
FIG. 8 illustrates a host machine that assigns packets for different VMs into a same queue.

As illustrated in FIG. 8, the host machine 800 is operating eight different VMs 811-818 (VM "A" through "H"). The host machine also has computing resources 861-864 for operating the VMs 811-818. The host machine also includes a RX processing module 820, four incoming data buffers 831-834, and a queue assignment module 850. In some embodiments, the incoming data buffers 831-834 are NIC queues in a PNIC (not illustrated), and the queue assignment module 850 is part of the PNIC. In some embodiments, the incoming data buffers 831-834 and the queue assignment module 850 are implemented in a virtualization software (not illustrated) running on the host machine 800.

The RX processing module 820 encapsulate functions performed by the host machine that retrieve, process, and forward packets to the VMs 811-818. In some embodiments, the RX processing module 820 includes a software forwarding element for forwarding packets to the VM as well as network stacks for processing network protocols for the VMs 811-818. In some embodiments, the RX processing module 820 represents a collection of software modules performed by the virtualization software running on the host machine 800.

The queue assignment module 850 receives incoming packets from the physical network 850 and assigns the received packets to the incoming data buffers 831-834. As mentioned, different embodiments assign incoming packets to queues based on different types of criteria (MAC address, five-tuple, simple hashing, etc.). Furthermore, in some embodiments, different queues in a NIC can be programmed to accept packets based on a mixture of different types of criteria.

As illustrated, at least some of the incoming data buffers have packets from different queues. Specifically, the queue 831 is assigned packets for VMs 811 and 812 (VMs A and B), the queue 832 is assigned packets for VMs 813, 814, and 815 (VMs C, D, and E), the queue 833 is assigned packets for VM 816 (VM F), and the queue 834 is assigned packets for VM 817 and 818 (VMs G and H). In this particular example, the sharing of at least some of the queues by multiple VMs is necessary because there are more VMs (eight) than there are queues (four). In some embodiments, each incoming data buffer or queue is associated with a computing resource (e.g., a thread or a CPU core), and VMs that operates on a same computing resource would share a same queue, regardless of whether there are more VMs than queues. In this example, the VMs 811-813 are operating on a same computing resource 861, so the data packets for the VMs 811-813 are assigned to a same queue 831.

As illustrated, the LRO operations of the queues 831-834 are governed by LRO aggregation rules 841-844, respectively. Thus, the rule 841 governs the LRO aggregation operations of the VMs 811-812, the rule 842 governs the LRO aggregation operations of the VMs 813-815, the rule 843 governs the LRO aggregation operations of the VM 816, and the rule 844 governs the LRO aggregation operations of the VMs 817-818.

In some embodiments, the assignment of packets to queues is such that packets for a particular VM may end up in different queues. This can occur if the queue assignment is at least partly based on simple hash, or if the queue assignment is at least partly based on flow or micro-flow (e.g., specified by five tuple identifiers for a TCP connection session) filtering that does not correspond directly to a VM in the host machine. Consequently, in some of these embodiments, LRO rules may be applicable to only some packets of a VM (e.g., belonging to a particular connection session) but not to other packets of the same VM (e.g., not belonging to the particular connection session).

Figure 9:
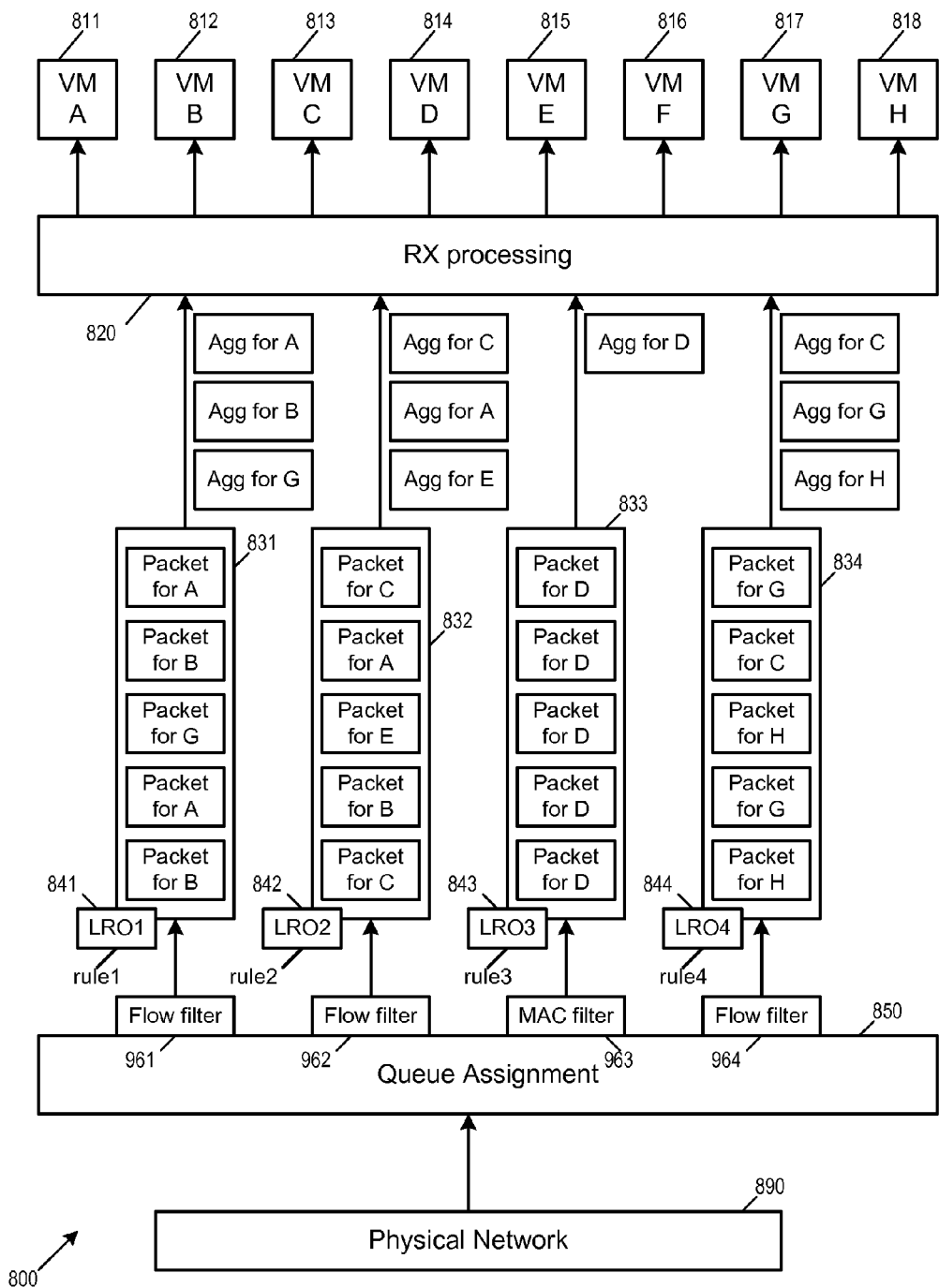
FIG. 9 illustrates the assignment of packets for a same VM into different queues.

FIG. 9 illustrates the assignment of packets for a same VM into different queues in the host machine 800. The queue assignment module 850 of the host machine 800 is applying a different set of filters in FIG. 9 than in FIG. 8. As illustrated, this different set of filters cause the queue assignment module 850 to assign packets for the VM 811 to both the queues 831 and 832, packets for the VM 817 to both the queues 831 and 834.

As illustrated, the queue assignment module 850 is applying a connection session filter 961 on the queue 831 and another connection session filter 962 on the queue 832, such that packets for the VM 811 ends up in both the queue 831 and the queue 832. In contrast, the queue assignment module 850 is applying a MAC filter 963 to the queue 833 that allows only packets for the VM 814 to enter the queue 833. The packets for the VM 814 are not distributed across different queues.

Because packets for a same VM can be in different queues, packets for one particular VM are simultaneously aggregated under different LRO rules associated with these different queues. In some embodiments, a same set of LRO rules are applied across different queues such that packets of a same VM being assigned to different queues may be aggregated under that same set of rules. In some embodiments, multiple LRO rules are applied to one queue such that packets for different VMs can have different LRO aggregation rules even though they share the same queue. Examples of LRO rules that are applied across different queues will be further described by reference to FIG. 15 below.

II. LRO Aggregation Rules

As mentioned, LRO aggregation of incoming data packets to VMs of a host machine can be turned on or off based on LRO aggregation rules. In some embodiments the LRO aggregation rules are implemented on individual NIC queues of a PNIC as discussed above by reference to FIGS. 3-5. In some embodiments, the LRO aggregation rules are implemented within a virtualization software of a host machine as discussed above by reference to FIGS. 6-7.

In some embodiments, a LRO aggregation rule is implemented as a destination address filter that enables LRO operation for specific destination address (MAC address, IP address, or other types of destination address). In some embodiments, a LRO aggregation rule specifies a particular "flow" or "microflow" for which LRO operation is to be enabled. In some of these embodiments, the flow is specified by a set of parameters that specifies a network session or connection (e.g., the five-tuple parameters of a TCP/IP connection). In other words, the LRO rule specifies that packet aggregation is to be turned on for data packets of a particular network session or transport connection but not for others.

For instance, some embodiments use the five-tuple IP data in the L3 and L4 packet header to classify the packet payload. The five-tuple data include source port identifier, destination port identifier, source IP address, destination IP address, and the protocol. Using these five identifiers, some embodiments can selectively turn on or off LRO aggregation for IP packets of different types, such as VOIP packet, video packet, audio packet, FTP packet, HTTP packet, HTTPS packet, Remote Desktop packet (PCoIP, VNC, RDP), management packet (authentication, server health monitoring, time synchronization), E-mail packet (POP3, SMTP), etc.

The examples provided below illustrates how the five tuples can be used to differentiate web traffic, VoIP, video streaming, remote desktop, management, e-mails, by using the following notation: Protocol-src_ip-dst_ip-src_port-dest_port, with * denoting wildcard match. In these examples, it is assumed that that a VM is the client that requests the service/data/service from the server.

Web: TCP-*-*-*-80/443 (80 for HTTP and 443 for HTTPS)
VoIP (Skype): TCP-*-*-23399-* or TCP-*-*-*-23399 (incoming and outgoing traffic)
Video Streaming (MMS): TCP-*-*-*-1755
Remote Desktop (PCoIP): TCP-*-*-*-4172
Authentication (Kerberos): TCP-*-*-*-88
E-Mail (POP3): TCP-*-*-*-110

Figure 10:
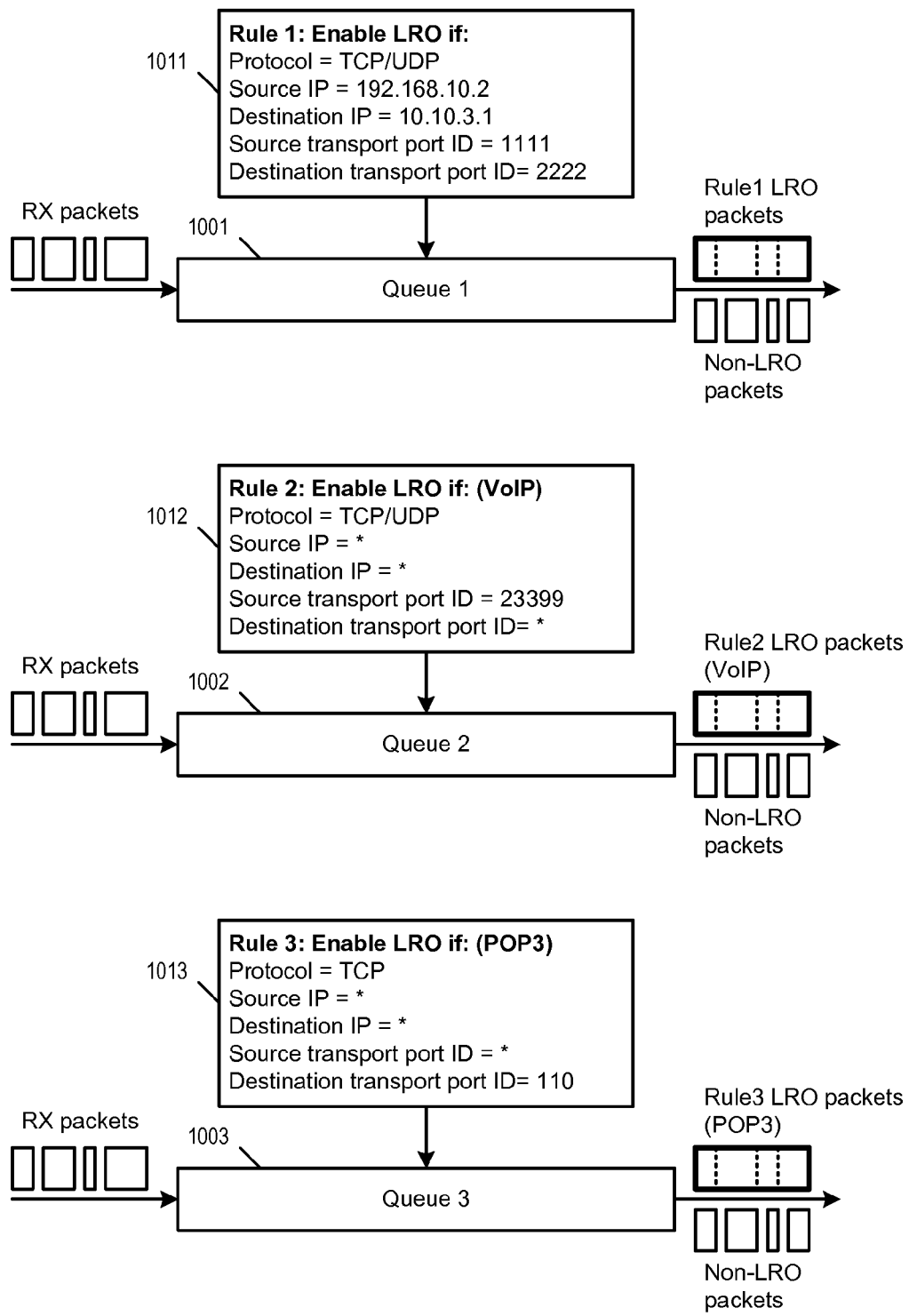
FIG. 10 illustrates different queues that are each enabled to perform LRO aggregation under different five-tuple filtering.

For some embodiments, FIG. 10 illustrates different queues (or incoming packet buffers) 1001-1003 that are each enabled to perform LRO aggregation under different five-tuple filtering. In some embodiments, the queues 1001-1003 are NIC queues inside a PNIC. In some embodiments, these queues are implemented within the virtualization software of the host machine. Each queue is enabled to perform LRO aggregation under its own LRO aggregation rule, such that a packet received from a physical network arriving at a particular queue will be aggregated into a LRO packet only if it meets the criteria set forth in the LRO aggregation rule of the particular queue. As illustrated, the queues 1001-1003 are enabled to perform LRO aggregation under LRO aggregation rule 1011-1013, respectively.

The LRO aggregation rule 1011 is a five-tuple filter that does not have any wild cards. It specifies that LRO operation would only be performed for packets that comes from a specific sender (source IP 192.168.10.2) and to a specific recipient (destination IP 10.10.3.1). It further specifies that LRO operation would only be performed for packets of a particular transport connection (source transport port 1111 and destination transport port 2222), and that the transport protocol is TCP. Consequently, the queue 1012 would accumulate only data packets with headers having the five-type of TCP-192.168.10.2-10.10.3.1-1111-2222. All other packets arriving at the queue 1001 will not be aggregated into an LRO packet.

The LRO aggregation rule 1012 is a five-tuple filter having several wild cards. In fact, it only specifies only that the protocol used is TCP, and that the source transport port be 23399 (i.e., VoIP). In other words, the LRO aggregation rule 1012 states that any packet with source transport 23399 and protocol TCP will be aggregated into LRO packets. When applied to the queue 1002, the LRO aggregation rule 1012 causes packets assigned to the queue 1002 to be aggregated into LRO packet if it has source transport 23399 and protocol TCP (i.e., VoIP).

The LRO aggregation rule 1013 is also a five tuple filter having several wild cards. It specifies only that the protocol be TCP and that the destination transport port be 110 (i.e., POP3). In other words, the LRO aggregation rule 1013 states that any packet with destination transport port 110 and protocol TCP will be aggregated into LRO packets. When applied to the queue 1003, the LRO aggregation rule 1013 causes packets assigned to the queue 1003 to be aggregated into LRO packet if it has destination transport port 110 and protocol TCP (i.e., POP3).

FIG. 10 illustrates only "positive" LRO aggregation rules, specifically, the illustrated LRO aggregation rules 1011-1013 are all rules that enables LRO aggregation if the conditions set forth in the rule (i.e., five tuple or MAC filtering) are met. Though not illustrated, some embodiments allow "negative" LRO aggregation rules that disable LRO aggregation if the conditions set forth in the rules are met. In some embodiments, there can be a mixture of types of rules, i.e., some queues can have positive LRO aggregation rules, some queues can have negative LRO aggregation rules, some queues can have five-tuple filter that specifies a transport connection, and some queues can have filters based on destination address (MAC or IP) filtering. Some embodiments also support compound LRO rules that aggregate packets for multiple flows or destination addresses.

Different embodiments implement queues for buffering incoming receive data packets differently, and the LRO aggregation rules are applied differently in those different embodiments when creating LRO aggregated packets. FIG. 10 illustrates the application of different LRO aggregation rules to different queues in the host machine, where a LRO aggregation rule applied to a particular queue creates LRO aggregated packet by aggregating only packets assigned to that particular queue. As mentioned above, in some embodiments, each NIC queue is assigned to a computing resource such as a processor core or a processing thread. An LRO aggregation rule applied to such a queue is therefore applicable to the VM or the network stack that is being processed by that assigned computing resource.

Figure 11:
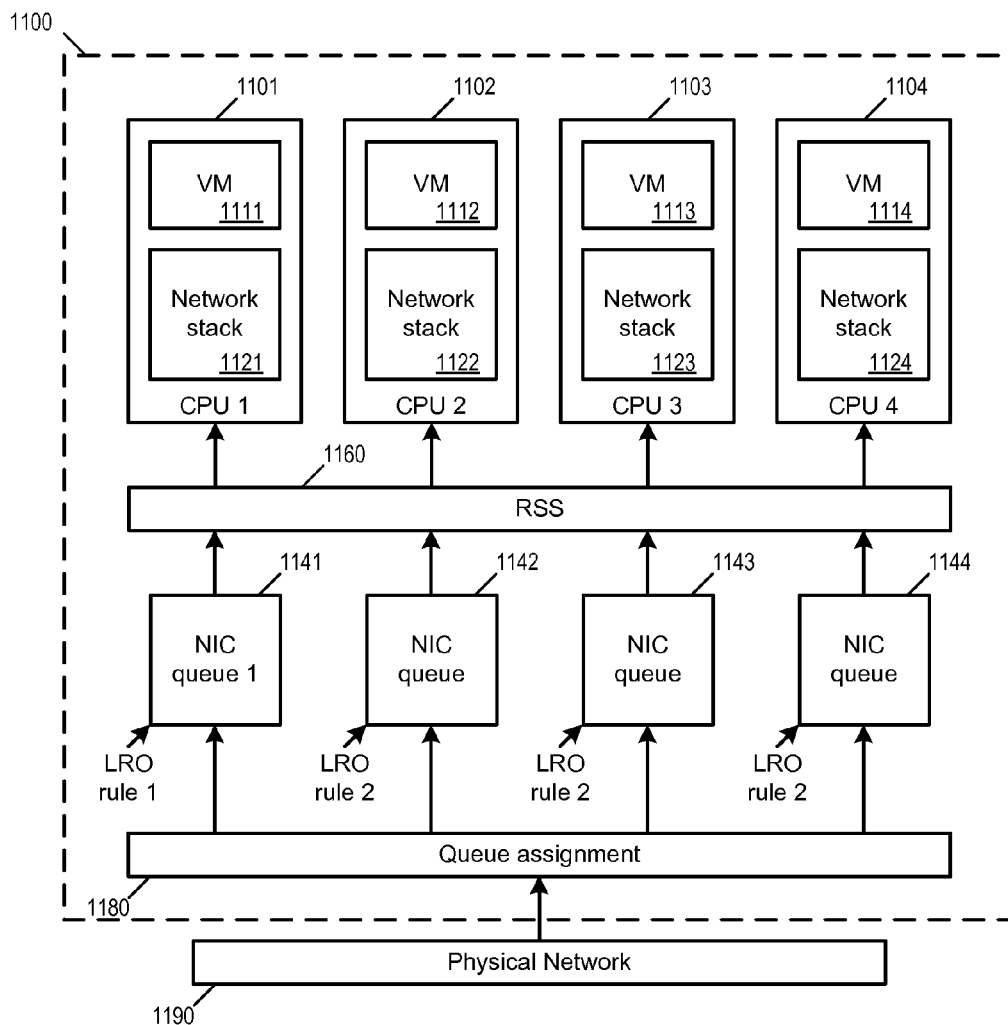
FIG. 11 illustrates LRO aggregation rules applied to queues that are assigned to computing resources in a host machine.

For some embodiments, FIG. 11 illustrates LRO aggregation rules applied to queues that are assigned to computing resources in a host machine 1100. As illustrated, the host machine 1100 has computing resources (labeled as CPUs) 1101-1104 that are used to operate VMs 1111-1114 and network stacks 1121-1124. Specifically, the computing resource 1101 is for operating the VM 1101 and the network stack 1121, the computing resource 1102 is for operating the VM 1102 and the network stack 1122, etc. The host machine 1100 also has NIC queues 1141-1144 in a PNIC (not illustrated) for buffering incoming data packets from a physical network 1190. The host machine 1100 includes a queue assignment module 1180 for assigning each incoming data packets from the physical network 1190 into one of the queues 1141-1144 in the PNIC. The host machine 1100 also includes a RSS module 1160 (receive side scaling) for assigning network traffic from the NIC queues to the computing resources.

As illustrated, each NIC queue receives its own LRO aggregation rule and performs LRO aggregation on data packets assigned that queue based on the received rule. Since the network traffic from the queues are distributed by the RSS module 1160 to one of the computing resources 1101-1104, the LRO aggregation rule applied to a particular queue is applicable to the computing resource that is selected by the RSS 1160 to receive data packets (LRO aggregated or not) from that particular queue. In some embodiments, the RSS 1160 selects computing resources to receive data from the queues in a manner to balance the computational loads between the different computing resources.

In some embodiments, each VM and its corresponding network stack (e.g., the VM 1111 and the network stack 1121) are handled by a same computing resource (such as a same CPU, a same CPU core, or a same processing thread of a CPU). A LRO aggregation rule applied to a queue that is assigned to a computing resource is therefore applied to the VM that is performed by that computing resource. For example, if the traffic from NIC queue 1141 is assigned to the computing resource 1101, then the LRO aggregation rule would be producing LRO aggregated packets for the VM 1111. In some embodiments, the RSS 1160 ensures that a thread of a VM stays on a CPU for the duration of a network connection session, and thus an LRO aggregation rule that enables LRO aggregation for a particular five-tuple would remain applicable for the VM for the duration of the network connection session according to that particular five-tuple.

Figure 12:
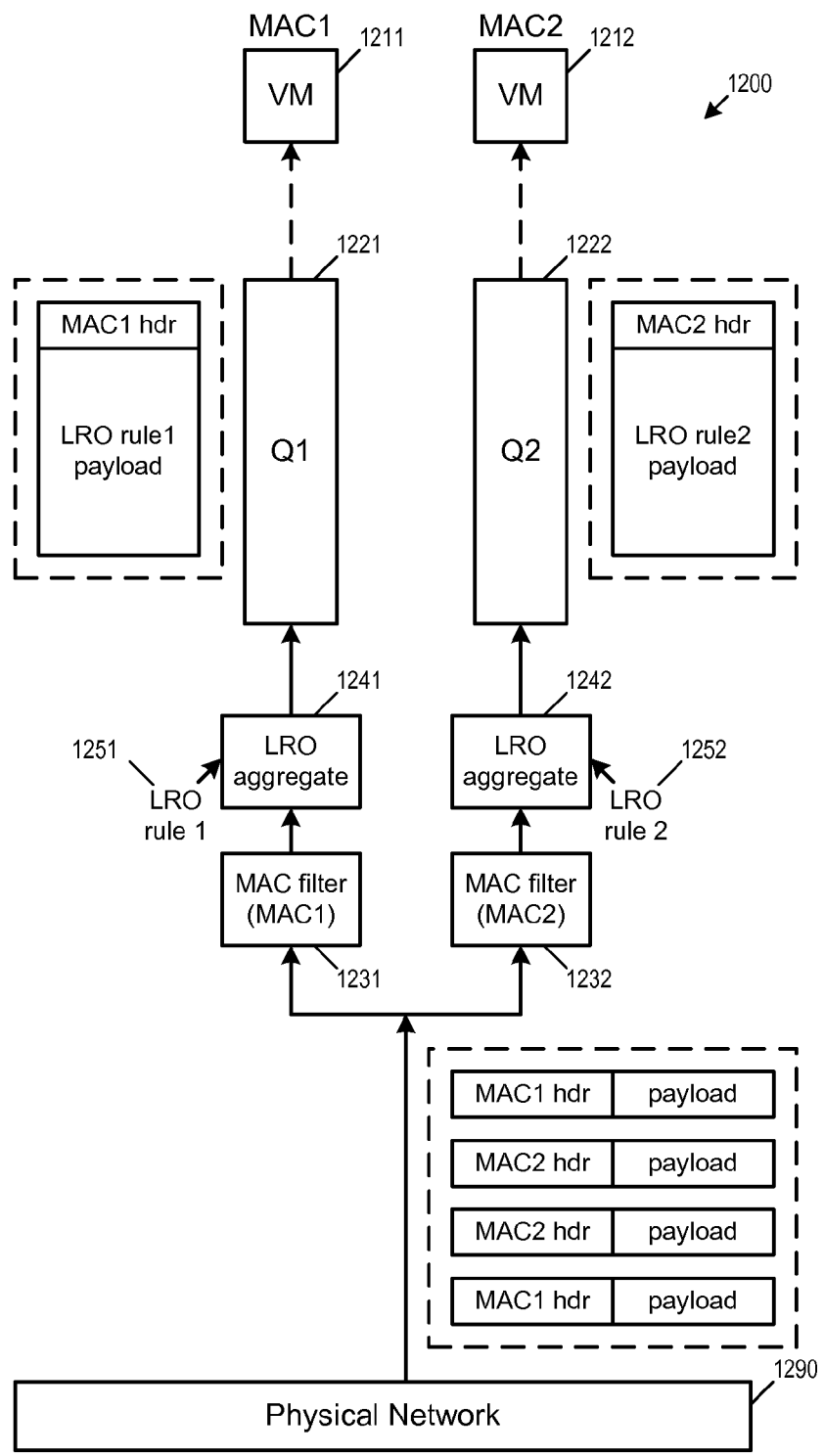
FIG. 12 illustrates LRO aggregation rules applied to NIC queues or incoming packet buffers that are each associated with a VM.

FIG. 11 illustrates LRO aggregation rules that are applicable to computing resources in host machines rather to VMs directly. In some embodiments, each queue is directly associated with a VM, and therefore a LRO rules applied to a particular queue is always applicable to that particular VM. FIG. 12 illustrates LRO aggregation rules applied to NIC queues or incoming packet buffers that are each associated with a VM.

FIG. 12 illustrates a host machine 1200 that is operating VMs 1211 and 1212. The host machine also has queues 1221 and 1222 for buffering incoming data packets from a physical network 1290. The queue 1221 receives incoming data packets that pass through a filter 1231 and the queue 1222 receives incoming data packets that pass through a filter 1232. The packets in the queue 1221 are aggregated by LRO aggregation module 1241, which enables LRO aggregation based on LRO aggregation rule 1251. The packets in the queue 1222 are aggregated by LRO aggregation module 1242, which enables LRO aggregation based on LRO aggregation rule 1252.

As illustrated, the VM 1211 has a MAC address "MAC1" and the VM 1212 has MAC address "MAC2". The queue 1221 receives only packets destined for VM 1211, because the filter 1231 is a MAC filter that allows only data packets destined for address "MAC1" to enter the queue 1221. Likewise, the queue 1222 receives only packets destined for VM 1212, because the filter 1232 is a MAC filter that allows only data packets destined for address "MAC2" to enter the queue 1222. Consequently, the LRO aggregation rule 1251 applied to the queue 1221 is applicable only to packets destined for the VM 1211, and the aggregated packet produced under LRO aggregation rule 1251 is always destined for VM 1211, regardless of whether the LRO aggregation rule 1251 actually specifies the destination address (e.g., by having wild card on the "destination IP" part of the five-tuple.) Likewise is true for the LRO aggregation rule 1252 applied to the queue 1222 and the VM 1212.

Though the example of FIG. 12 uses L2 MAC address of a VM for filtering the incoming packets into the VM's corresponding queue, one of ordinary skill would understand that other address schemes that uniquely address a VM can also be used for filtering packets into the VM's queue. For example, some embodiments use the L3 IP address of the VM as filter for the VM's queue.

As mentioned, in some embodiments, NIC queues (or incoming packet buffers) are not necessarily tied to VMs. In some of these embodiments, the LRO aggregation rule or rules applicable to a NIC queue would be applied to all incoming packets to that queue. The host machine would then forward the packets from the queue (aggregated and non-aggregated) to their destination based on the destination address (e.g., destination IP or destination MAC address) in the packet headers.

Figure 13:
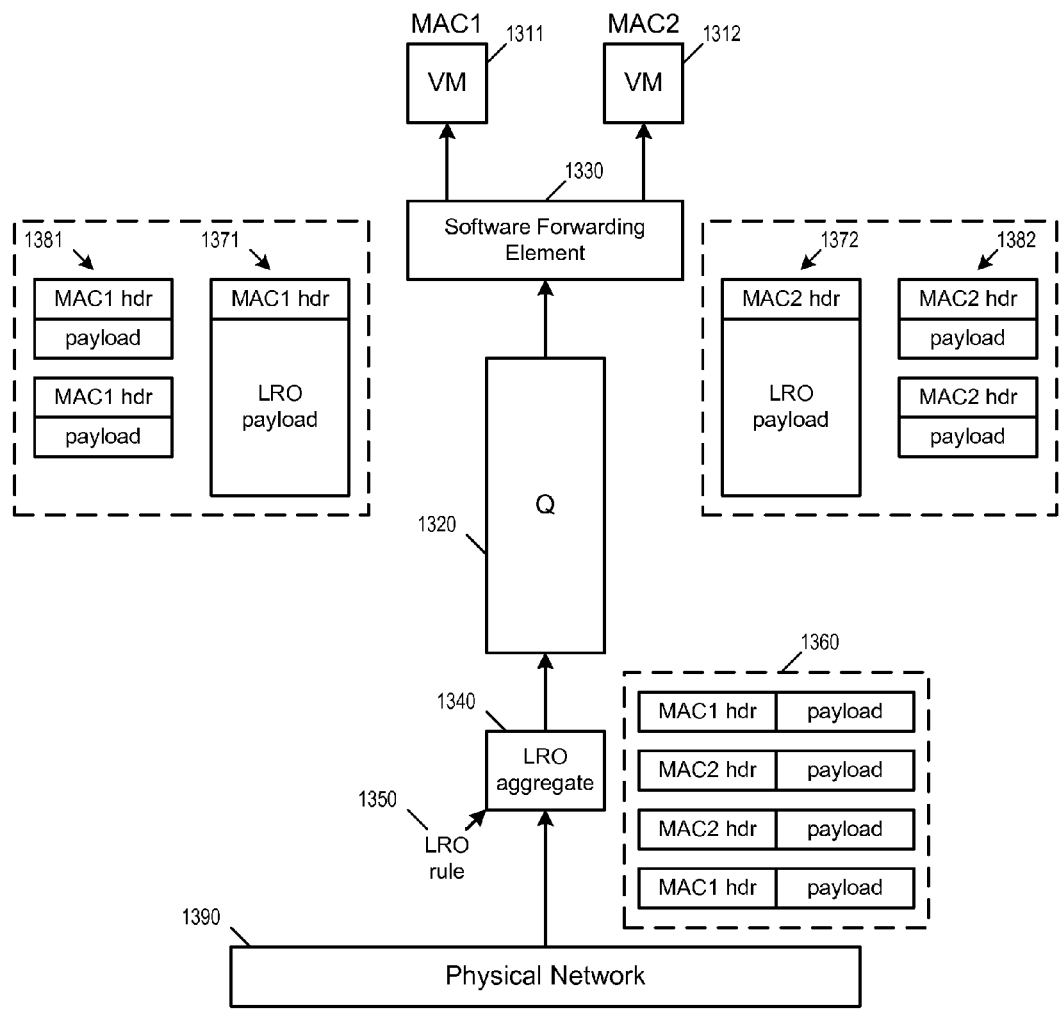
FIG. 13 illustrates an LRO aggregation rule applied to a queue that is not bound to any specific VMs.

For some embodiments, FIG. 13 illustrates an LRO aggregation rule applied to a queue that is not bound to any specific VMs. FIG. 13 illustrates a host machine 1300 that is operating VMs 1311 and 1312. The host machine has a queue 1320 for buffering incoming data packets from a physical network 1390. The host machine also has software forwarding element 1330 for forwarding packets from the queue 1320 as well as other incoming packet buffers (not illustrated) to the VMs 1311, 1312, and others (not illustrated). An LRO aggregation module 1340 receives a LRO aggregation rule 1350 for determining whether to aggregate packets in the queue 1320 into LRO aggregated packets. In some embodiments, the LRO aggregation rule 1350 is a five-tuple flow or microflow.

As illustrated, the queue 1320 receives incoming data packets 1360 from the physical network 1390, the incoming data packets including some packets with destination address "MAC1" (the MAC address of VM 1311) and some packets with destination address of "MAC2" (the MAC address of VM 1312). These packets 1360 arrive at the queue 1320, and the LRO aggregation module 1340 applies the LRO aggregation rule 1350 to create aggregated packets 1371 with destination address "MAC1" and aggregated packets 1372 with destination address "MAC2". Packets that do not meet the requirement of LRO aggregation rule 1350 remain non-aggregated (non-aggregated packets 1381 for "MAC1" and non-aggregated packets 1382 for "MAC2".) The packets, whether aggregated or non-aggregated, are then forwarded by the software forwarding element 1330 to their respective destinations (the VM 1311 or the VM 1312) based on the destination address in the header.

Figure 14:
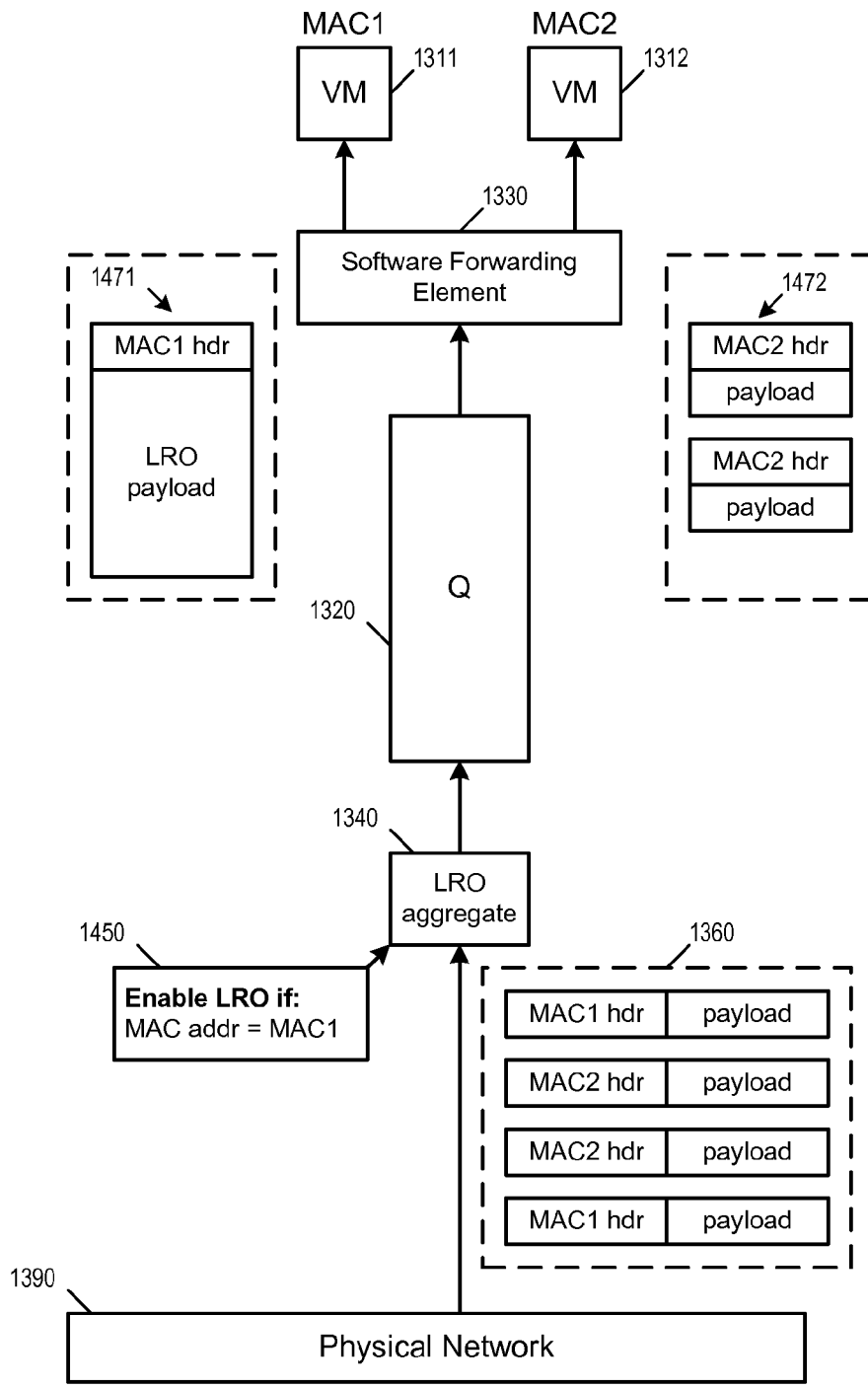
FIG. 14 illustrates an LRO aggregation rule that specifies only a destination address for a queue in a host machine.

In some embodiments, the LRO aggregation rule specifies only the destination address. In other words, the LRO aggregation rule enables LRO aggregation only for a VM having a particular address (IP address or MAC address), while packets for any other VMs will not be aggregated. For some embodiments, FIG. 14 illustrates an LRO aggregation rule 1450 that specifies only a destination address for the queue 1320 in the host machine 1300.

The LRO aggregation rule 1450 is a rule that specifies that LRO aggregation is to take place for packets with destination MAC address "MAC1", while all other packets (i.e., packets with other destination MAC address) will not be aggregated. Consequently, all packets (packets 1471) being forwarded to the VM 1311 by the software forwarding element 1330 are LRO aggregated, and packets being forwarded to the VM 1312 (packets 1472) by the software forwarding element 1330 are not LRO aggregated.

In some embodiments, each particular LRO aggregation rule is applied not only to a one particular queue or incoming packet buffer, but is instead applied to all incoming data packets stored in all queues. Furthermore, multiple LRO aggregation rules are actively simultaneously to aggregate LRO packets under different rules, and the LRO operations of at least one of the queues (or some or all of the queues) are governed by multiple LRO aggregation rules.

Figure 15:
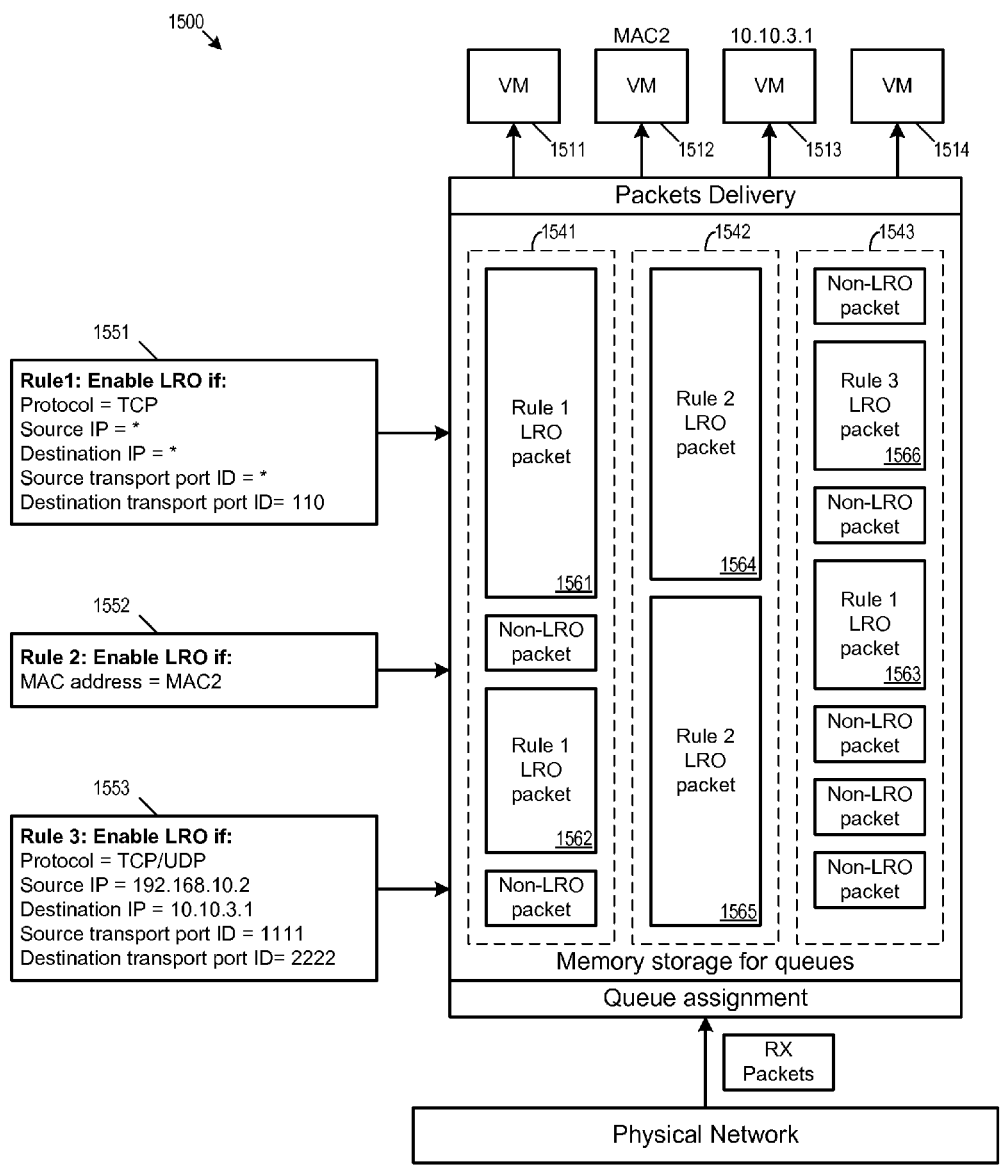
FIG. 15 illustrates a host machine in which LRO aggregation rules are being applied across different NIC queues or incoming packet buffers.

FIG. 15 illustrates a host machine 1500 in which multiple LRO aggregation rules are being applied across different NIC queues or incoming packet buffers. As illustrated, the host machine 1500 is operating VMs 1511-1514, each of which receives data packets from a network stack (not illustrated), which in turn receive data from one of the queues 1541-1543 for buffering incoming data packets. These queues can be NIC queues in a PNIC (not illustrated) of the host machine 1500, or a software implemented data buffers managed by a virtualization software (not illustrated). FIG. 15 also illustrates a memory storage 1530, which can be one or more memory storage devices storing the contents of the queues. In some embodiments, the retrieval of a data packet (whether aggregated or not) from a particular queue is accomplished by using an address pointer maintained by the particular queue to read a block data stored in the memory storage 1530. One of ordinary skill would realize that, for some embodiments, such a memory storage device can be used to implement some or all of the queues or incoming packet buffers discussed in Sections I and II.

The host machine 1500 has three different LRO aggregation rules 1551-1553 that are applied to the queues 1541-1543. Each of the LRO aggregation rules 1551-1353 is applied to all three queues 1541-1543. Each LRO aggregation rule has a different effect on different queues depending on the packets being held in each queue.

The LRO aggregation rule 1551 is a 5-tuple rule that does not specify a specific destination address (i.e., having wild cards in destination IP). The rule 1551 therefore affects all VMs and all queues, and both queues 1541 and 1543 have LRO aggregated packets under rule 1551 (aggregated packets 1561, 1562, and 1563). However, since the rule 1551 does require that the destination transport port be "110" and the protocol be "TCP", any packet that does not have the matching transport port ID or protocol required by the five tuple in 1551 will not be aggregated under this rule.

The LRO aggregation rule 1542 is a MAC filter, it enable LRO aggregation only for the VM with MAC address "MAC2". The rule 1552 therefore affects only a queue that is holding data packets destined for MAC address "MAC2" (i.e., the VM 1512). In the example of FIG. 15, only the queue 1542 is holding packets destined for VM 1512, and therefore only the queue 1542 has LRO aggregated packet created under the rule 1552. Furthermore, in this example, the queue 1542 holds only packets destined for the VM 1512, and therefore all of the data packets in the queue 1542 are aggregated under the rule 1552 (aggregated packets 1564 and 1565).

The LRO aggregation rule 1553 is a completely specified five-tuple filter with a specified destination IP address "10.10.3.1". The rule 1553 therefore affects only a queue that is holding data packets destined to IP address "10.10.3.1" (i.e., the VM 1513). In the example of FIG. 15, only the queue 1543 is holding packets destined for the VM 1513, and therefore only the queue 1543 has LRO aggregated packet created under the rule 1553 (aggregated packet 1566). Furthermore, since the rule 1553 also requires that the protocol be "TCP/UDP", the source "192.16.10.2", the source transport port ID be "1111", the destination transport port ID be "2222", any packets failing to meet the these requirement will not be aggregated under the rule 1553.

Figure 16:
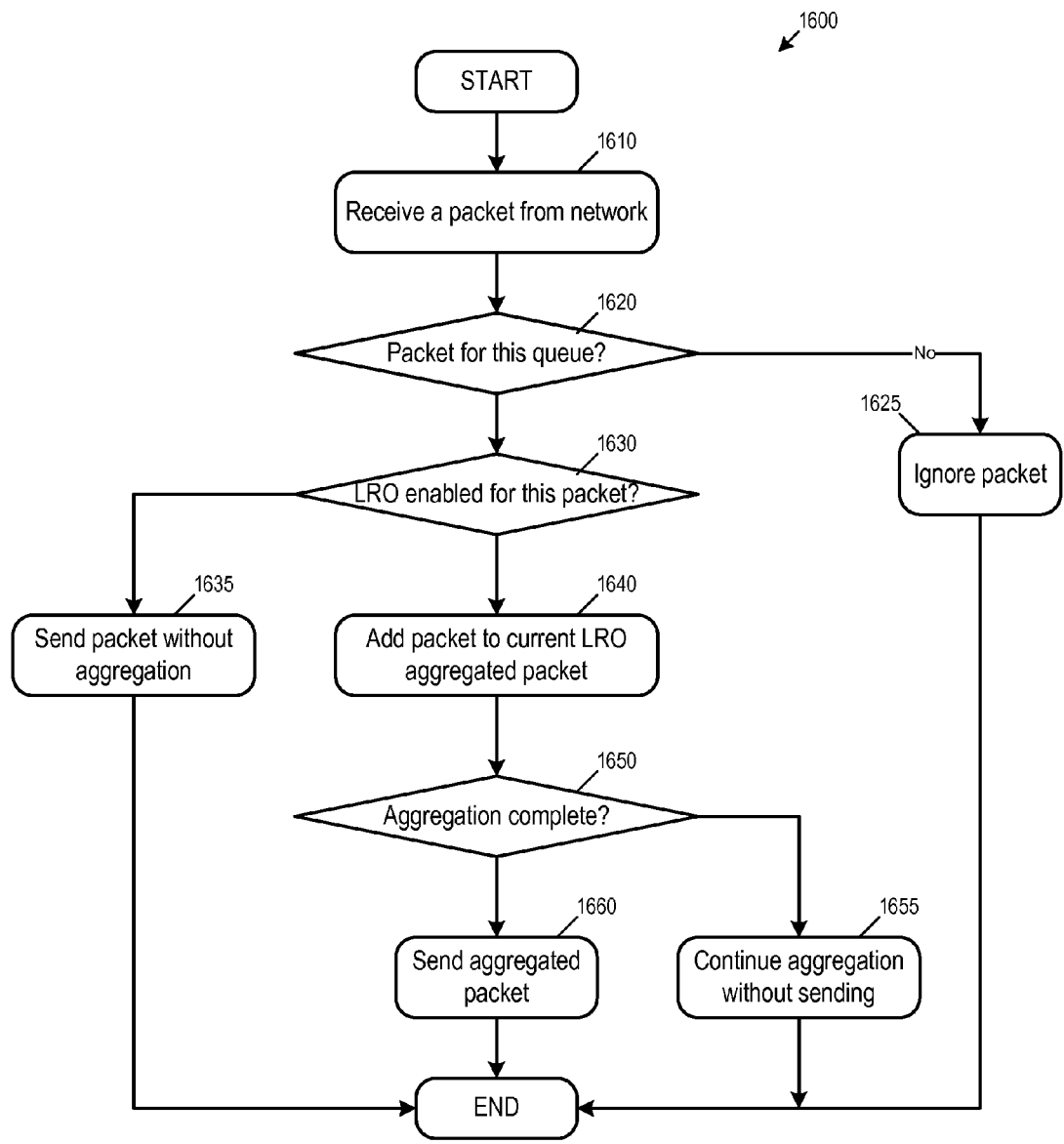
FIG. 16 conceptually illustrates a process for applying LRO aggregation rules to packets in NIC queues or incoming packet buffers.

For some embodiments, FIG. 16 conceptually illustrates a process 1600 for applying LRO aggregation rules to packets in NIC queues or incoming packet buffers. In some embodiments, the process 1600 is performed by a PNIC for each of its NIC queues. In some embodiments, the process 1600 is performed by a virtualization software implementing LRO aggregation in its software implemented incoming packet buffers.

The process 1600 starts when it receives (at 1610) a packet from the physical network. The process then determines (at 1620) whether the packet is for this queue. In some embodiments, the process applies a destination address filter (e.g., a MAC filter) that allows only packets with certain destination address or addresses into the queue. In some embodiments, the process applies other criteria, such performing hashing to determine whether the incoming data packet is to be assigned to a particular CPU that is assigned to the queue. If the packet is not for this queue, the process ignores (at 1625) the packet and let the packet be assigned to one of the other queues or incoming packet buffer and the process 1600 ends. If the packet is for this queue, the process proceeds to 1630.

At 1630, the process determines whether LRO aggregation is enabled for this packet. For a queue that uses five-tuple microflow as LRO aggregation rule to determine whether to perform LRO aggregation, the process examines whether the incoming packet meets the requirement of the five tuple. For a queue that uses another type of LRO aggregation rule (such as MAC filtering) the process examines the packet under the other criteria to determine whether to perform LRO aggregation. If the packet meets the requirement of the LRO aggregation rule, the process proceeds to 1640. If the packet does not meet the requirement of the LRO aggregation rule, the process proceeds to 1635.

At 1635, the process passes or sends the packet onto the VM without aggregation. In some embodiments, the process notifies (e.g., by interrupt) the processor core of the host machine to let it know that that a packet is ready to be retrieved. In some embodiments, the packet is stored in a memory area awaiting retrieval, and the process uses an API to notify the host machine processor core of the memory location of the data packet. The process 1600 then ends.

At 1640, the process aggregates or adds the received packet into a current LRO aggregated packet that is still being aggregated. The process then determines (at 1650) if the aggregation of the current LRO aggregated packet is complete. In some embodiments, the process compares the size of the LRO aggregated packet against a threshold size (usually larger than the MSS of TCP or MTU of Ethernet) to determine if the LRO aggregated packet is large enough for delivery/retrieval. If the LRO aggregated packet is complete and ready for retrieval, the process proceeds to 1660. If the LRO aggregated packet is incomplete and can aggregate more incoming received packet, the process proceeds to 1655 to continue aggregation and ends.

At 1660, the process passes or sends the aggregated packet onto the VM. In some embodiments, the process notifies (e.g., by interrupt) the processor core of the host machine to let it know that that a packet is ready to be retrieved. In some embodiments, the packet is stored in a memory area awaiting retrieval, and the process uses an API to notify the host machine processor core of the location in memory of the LRO aggregated packet. The process 1600 then ends.

III. Snooping Maximum Segment Size

As mentioned, some embodiments turn off LRO operations on VMs that are forwarding packets, partly because packets that are to be forwarded must comply with a maximum size requirement. Creating LRO aggregated packets that exceed the maximum size limit (e.g., Ethernet MTU) would require downstream segmentation operations (e.g., TSO operations) or fragmentation to dissolve the aggregated packets into smaller segments. However, some embodiments do perform LRO aggregation on packets being forwarded by a VM. Some of these embodiments then segment the LRO aggregated packet according to the Maximum Segment Size (MSS) of the TCP protocol before forwarding the segmented packets to their destination.

In some embodiments, for packets being forwarded through a VM with LRO having being turned on for the flows being handled by the VM, the VM in its forwarding path can snoop on the TCP traffic for MSS and maintain stateful table for these flows and mark the large packet for TSO processing based upon the MSS that it snooped. Doing so avoids breaking the OSI model and still takes the advantage of hardware assist/offload that is available in PNIC (for tasks such as packet aggregation and segmentation), and the VM does not have to do fragmentation on the packet in the forwarding path because of MTU limitation.

The MSS is the largest amount of data, specified in bytes, that TCP is willing to receive in a single segment. For best performance, some embodiments set the MSS small enough to avoid IP fragmentation, which can lead to packet loss and excessive retransmissions. Some embodiments announce MSS when the TCP connection is established. In some of these embodiments, MSS is derived from the maximum transmission unit (MTU) size of the data link layer of the networks to which the sender and receiver are directly attached. In some embodiment, the MSS is set to be smaller than MTU to ensure that a TCP segment complying with the MSS size requirement at TCP layer would not be further segmented or fragmented at Ethernet/data link layer.

The MSS is a parameter found in the TCP header of only certain types of packets (e.g., a TCP Syn/Ack packet), not just any TCP header. The MSS parameter is typically set by the TCP layer of the protocol stack that originates the connection and then used by the TCP layer of the protocol stack that terminates the connection. The MSS parameter is typically not available to the forwarding VM, since the network stack of the forwarding VM does not process forwarded traffic at TCP layer or above.

Figure 17A:
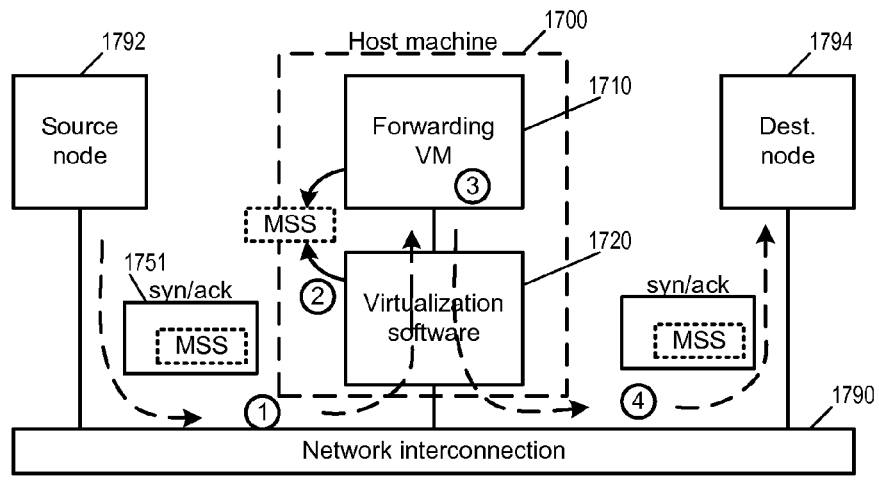
FIGS. 17a-b conceptually illustrates the snooping of MSS parameter and the use of the snooped MSS parameter for packet segmentation on packets being forwarded by a VM.
Figure 17B:
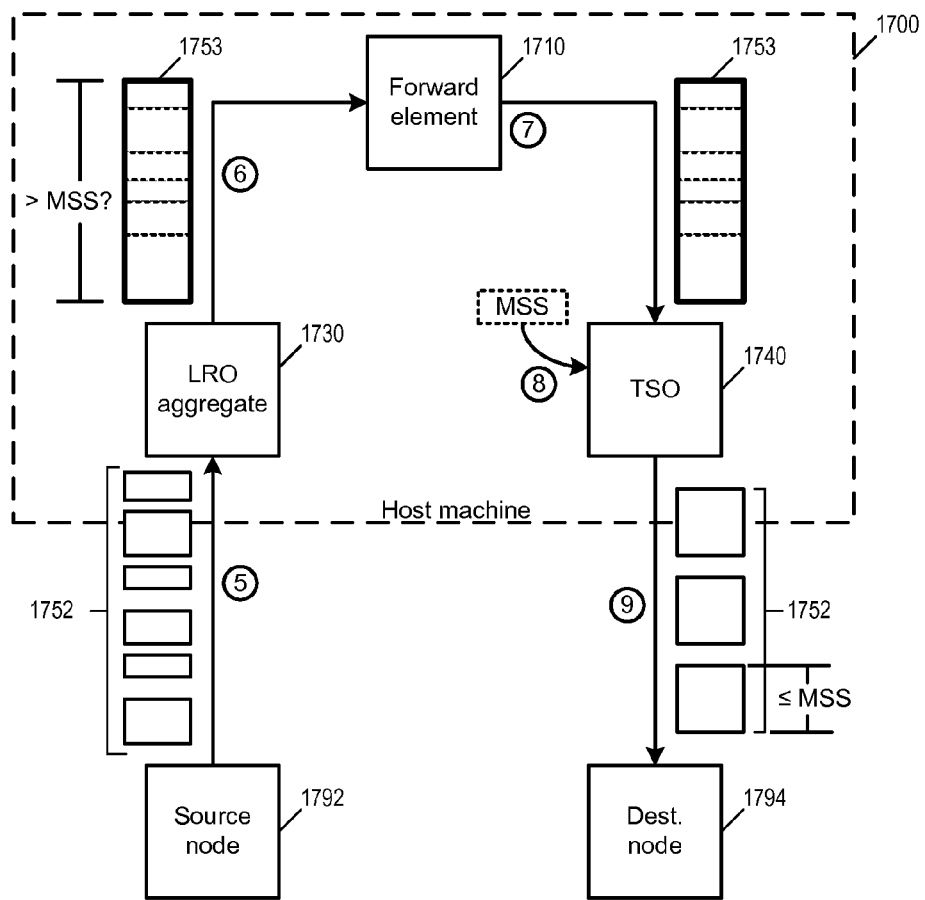

Some embodiments therefore snoop the packets being forwarded for its MSS parameter before using the snooped MSS parameter to perform Transmit Segmentation Offload (TSO) operation. FIGS. 17a-b conceptually illustrates the snooping of MSS parameter and the use of the snooped MSS parameter for packet segmentation on packets being forwarded by a VM. In the example, the packets are being forwarded by a VM 1710 of a host machine 1700 from a source network node 1792 to a destination network node 1794 over a physical network 1790. The host machine 1700 is also operating a virtualization software 1720 for hosting the VM 1710 and other VMs (not illustrated).

FIG. 17a illustrates the snooping of the MSS parameter in four operations labeled '1', '2', '3', and '4'. In operation '1', the source node 1792 sends a packet 1751 to the host machine 1700. The packet 1751 contains a TCP syn/ack packet of a particular TCP connection, whose header includes a MSS parameter. In operation '2', the packet 1751 reaches the host machine 1700, and the host machine extracts MSS parameter from the header of the TCP syn/ack packet and stores the extracted MSS. In some embodiments, the extraction of MSS is accomplished by the network stack of the VM 1710, which in some embodiments is considered to be part of the virtualization software of the host, while in some other embodiments the network stack of the VM 1710 is considered to be part of the VM itself. In operation '3', the VM 1710 forwards the packet 1751 (including the TCP syn/ack packet) through the virtualization software 1720. In operation '4', the packet 1751 reaches the destination node 1794. Though not illustrated, in some embodiments, the packet 1751 can be an LRO aggregated packet.

FIG. 17b illustrates LRO aggregation and the use of the snooped MSS to perform segmentation (TSO) operations on the LRO aggregated packets by the host machine 1700 in five operations labeled '5', '6', '7', '8', and '9'. In operation '5', the source node 1792 sends packets 1752 to the host machine 1700 destined for the forwarding VM 1710. In operation '6', the host machine 1700 receives the packets 1752 at an incoming packet buffer or NIC queue 1730 and perform LRO aggregation based on an applicable LRO aggregation rule. The LRO aggregation produced an aggregated packet 1753, which is larger in size than allowed by MSS. In operation '7', LRO aggregated packet 1753 reaches the VM 1710 and is forwarded by the VM. In operation '8', the host machine performs segmentation at a segmentation module 1740, which uses the earlier extracted MSS parameter to segment the LRO aggregated packet 1753 into segmented packets 1754 that are each smaller or equal in size than the extracted MSS. In some embodiments, the syn/ack packet from which the MSS parameter is snooped is for establishing a particular TCP connection, and the MSS parameter is therefore only used for segmenting packets of that particular TCP connection.

In some embodiments, packets being forwarded by a VM does not traverse all the way up in the network stack of the VM, but are rather handled at lower layers of the network stack only. Specifically, for packets being forwarded by a VM, some embodiments only handles the network protocol of the link layer (Ethernet layer) and the Internet layer (IP layer), but not for the TCP transport layer and/or above. Since MSS parameter is in TCP layer header but the forwarded packet is never processed by the forwarding VM's TCP layer, some embodiments snoop and extracts the MSS parameter from the TCP header when the lower layers of the network stack forwards the syn/ack packet.

Figure 18:
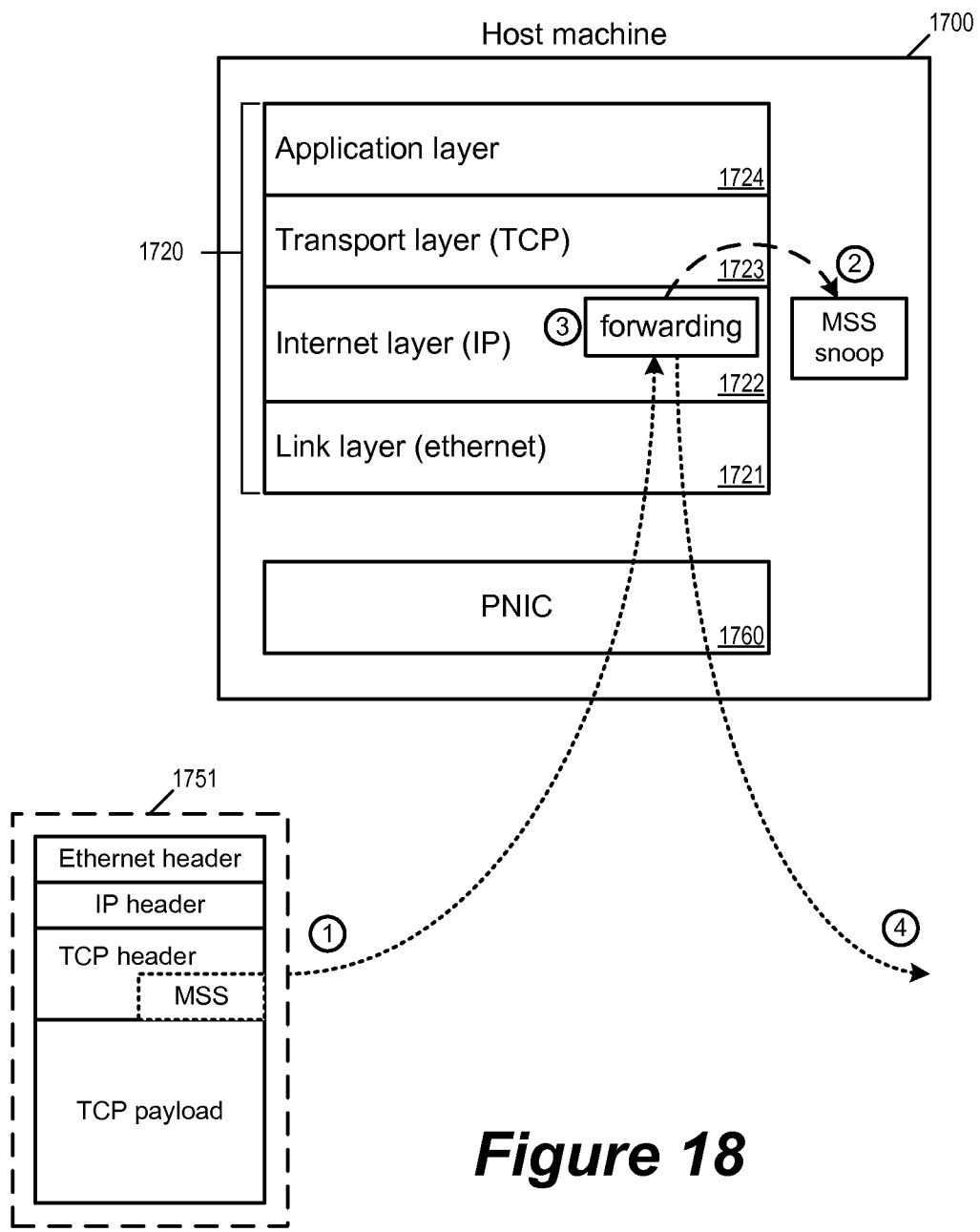
FIG. 18 illustrates the snooping and extraction MSS parameter at layers of network stack lower than TCP layer.

FIG. 18 illustrates the snooping and extraction of the MSS parameter at layers of network stack lower than TCP layer. Specifically, FIG. 18 illustrates the extraction of the MSS parameter from packet 1751 by a network stack 1720 of the VM 1710 in the host machine 1700. The host machine 1700 also includes a NIC 1760 for interfacing with the physical network. The network stack 1720 includes a link layer (Ethernet) 1721, an Internet layer (IP) 1722, a transport layer (TCP) 1723, and an application layer 1724.

As illustrated, the packet 1751 is a packet with several layers of encapsulation, in which successive higher layer header and payload are encapsulated as a lower layer payload along with a lower layer header. The packet 1751 encapsulates a TCP layer packet under IP layer and Ethernet layer, and consequently includes an Ethernet layer header, an IP layer header, and a TCP layer header and TCP payload. An MSS parameter is included in the TCP header since the encapsulated TCP layer packet is a TCP syn/ack packet. In some embodiments, the packet 1751 can be an LRO aggregated packet.

FIG. 18 illustrates the snooping and extraction of MSS parameter in four operations labeled '1', '2', '3', and '4'. In some embodiments, the operations '1' through '4' of FIG. 18 correspond to the operations '1' through '4' of FIG. 17a. In operation '1', the packet 1751 arrives at the host machine 1700, queued and delivered by the NIC 1760 to the network stack 1720. The network stack 1720 processed the protocols at the link layer 1721 and the internet layer 1722 but not at any higher layer (e.g., processed parameters in the link layer header and the IP layer header but not headers of other layers). In operation '2', the network stack 1720 performs snooping and extracts the MSS parameter from the TCP layer header without actually handling the TCP layer protocols (e.g., without processing the TCP layer header). In operation '3', the network stack 1720 forwards the packet 1751 through the NIC 1760. In operation '4', the packet 1751 is forwarded out of the host machine 1700 to its destination.

In some embodiments, the segmentation operation that uses the extracted MSS parameter is performed by the NIC 1760 of the host machine 1700. In some of these embodiments, the NIC 1760 is a PNIC that is performs both the aggregation operation (LRO) and the segmentation (TSO) within its own hardware without consuming CPU cycles at the host machine 1700. In some embodiments, the PNIC receives the MSS parameter from the network stack 1720 as a metadata that accompanies a LRO aggregated packet.

Figure 19:
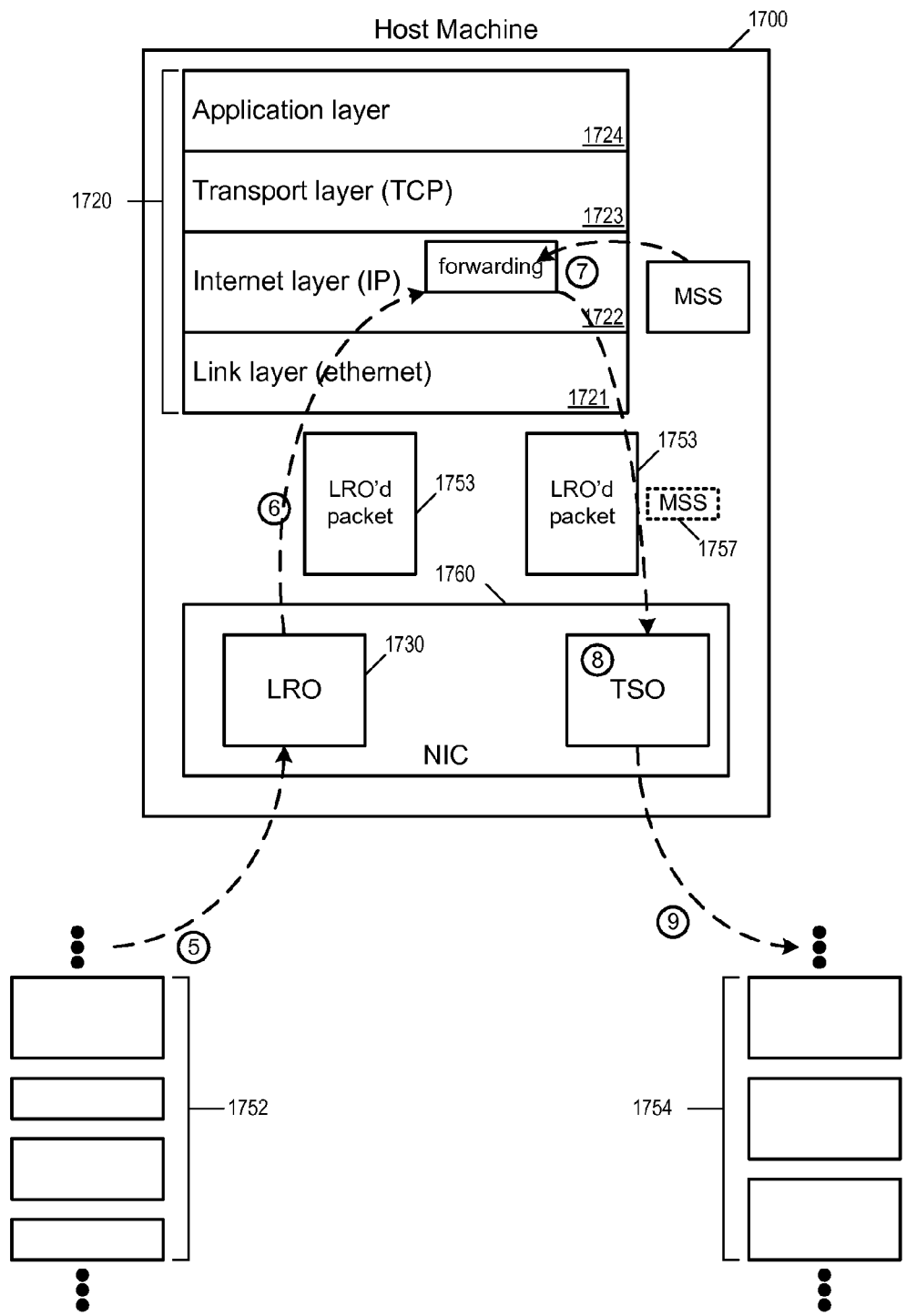
FIG. 19 illustrates the segmentation (TSO) operation by a PNIC based on a MSS parameter extracted by a network stack in a host machine.

For some embodiments, FIG. 19 illustrates the segmentation (TSO) operation by the PNIC based on a MSS parameter extracted by the network stack 1720 in the host machine 1700. As illustrated, the NIC 1760 in the host machine 1700 is a PNIC. It performs LRO aggregation on the incoming data packets 1752 and TSO segmentation the forwarded packet into the segmented packets 1754. In some embodiments, the PNIC 1760 performs LRO aggregation on the incoming packets 1754 at a NIC queue 1730 based on a LRO aggregation rule as described above in Sections I and II.

FIG. 19 illustrates the LRO and TSO operations in five operations labeled '5', '6', '7', '8', and '9'. In some embodiments, the operations '5' through '9' of FIG. 19 correspond to the operations '5' through '9' of FIG. 17b. In operation '5', the incoming packets 1752 arrive at the host machine 1700 from the source node 1792 and reach the PNIC 1760, where the packets are buffered at the queue 1730. In operation '6', the PNIC 1760 performs LRO aggregation according to a LRO aggregation rule applied to the packets at the queue 1730, which in turn produces an LRO aggregated packet 1753. In operation '7', the network stack 1720 of the VM 1710 handles the network protocols for the packet 1753 at the link layer 1721 and the internet layer 1720, and then forwards the LRO aggregated packet to the PNIC 1760 along with the MSS parameter that was previously extracted and stored. In some embodiments, the MSS parameter is passed to the PNIC 1760 as metadata 1757 accompanying the aggregated packet 1753. In operation '8', the PNIC 1760 performs segmentation on the LRO aggregated packet 1753 according to the MSS parameter received from the network stack 1720. In operation '9', the PNIC sends out segmented packets 1754 to the physical network, each segmented packet is smaller in size than the MSS.

As mentioned, in some embodiments, a VM in its forwarding path can snoop on the TCP traffic for MSS and maintains stateful tables for these flows and mark the large packet for TSO processing based upon the MSS that it snooped. A stateful VM keeps track of the state of network connections (such as TCP streams or UDP communication) and is able to hold significant attributes of each connection in memory. These attributes are collectively known as the state of the connection, and may include such details as the IP addresses and ports involved in the connection and the sequence numbers of the packets traversing the connection. Stateful inspection monitors incoming and outgoing packets over time, as well as the state of the connection, and stores the data in dynamic state tables. This cumulative data is evaluated, so that context that has been built by previous connections and/or previous packets belonging to the same connection would be available.

Figure 20:
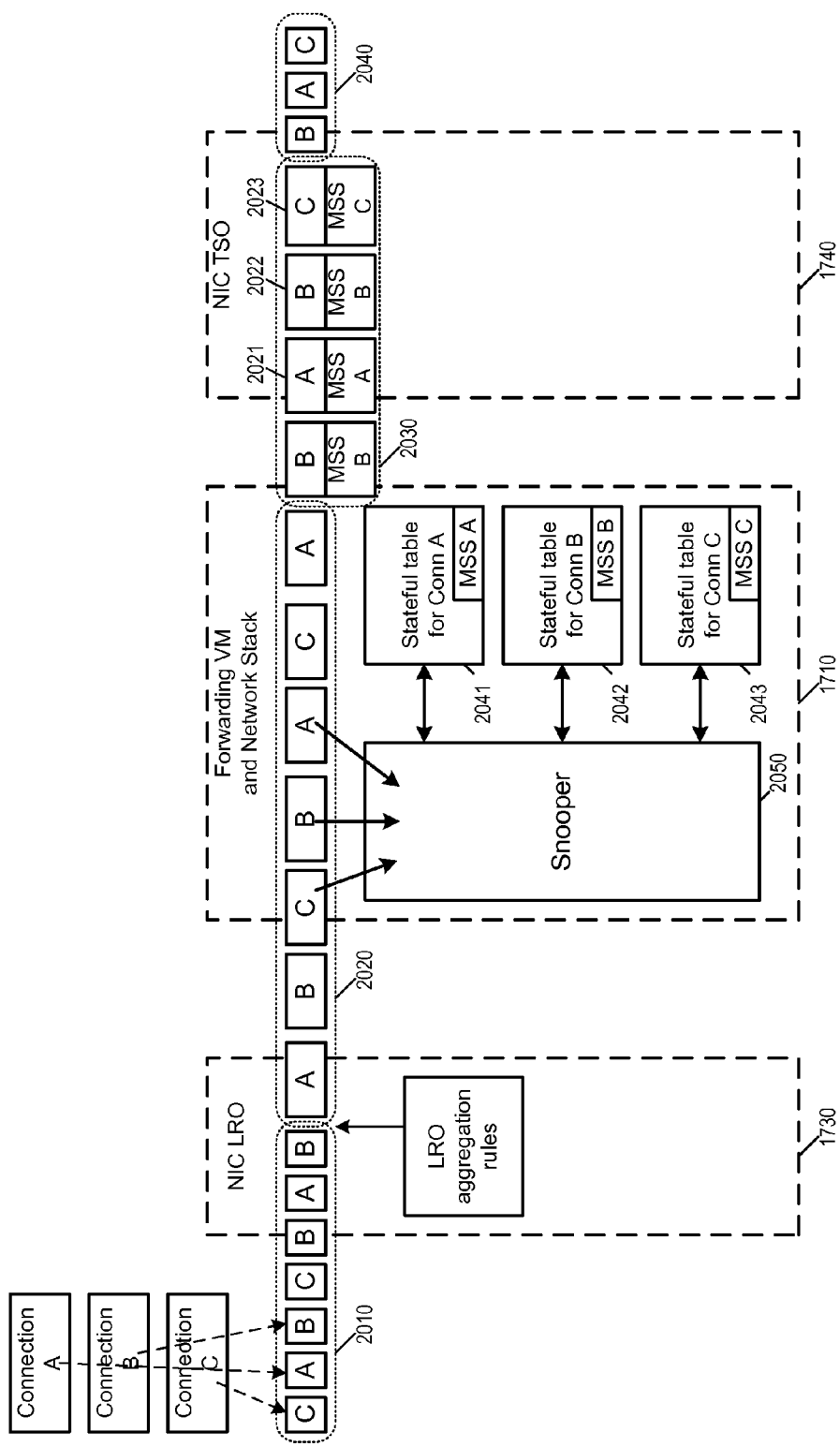
FIG. 20 conceptually illustrates the maintenance of stateful tables by a forwarding VM while snooping for MSS.

FIG. 20 conceptually illustrates the maintenance of stateful tables by a forwarding VM while snooping for MSS. Specifically, FIG. 20 illustrates the VM 1710 in the host machine 1700 snooping for MSS and maintaining stateful tables for three different TCP connections A, B, and C. Each stateful table of a TCP connection is in turn used to perform TSO segmentation operations on the traffic of that TCP connection.

As illustrated, the host machine 1700 is receiving packets 2010 from various source nodes. These received packets 2010 includes packets in different TCP connections A, B, C (rectangles labeled A, B, and C in 2010). In some embodiments, each TCP connection includes traffic in both directions (such as SYN and ACK packets) such that packets of a particular connection can come from either end of the TCP connection.

The LRO aggregation module 1730 applies LRO aggregation rules on the received packets 2010 and produces packets 2020. Since all of the received packets 2010 are to be processed and forwarded by the VM 1710, some embodiments assign all of the received packets 2010 to a same NIC queue in the PNIC, and the LRO module 1730 represents the LRO aggregation operation that takes place in one NIC queue. In some embodiments, packets destined for a same VM can be assigned to different queues, and the LRO aggregation module 1730 represents LRO aggregation operations performed at different queues of the NIC. In some embodiments, the LRO aggregation rule are flow based rules that target one or more TCP connections, i.e., only packets belonging to certain TCP connections will be aggregated. Though not indicated in the figure, some of the packets 2020 outputted by the LRO aggregation module 1730 are aggregated as they satisfy the criteria specified by the LRO rule, while some of the packets are not aggregated as they do not meet the LRO rule.

The packets 2020 are delivered to the VM 1710 and its corresponding network stack for processing and forwarding. The VM 1710 operates a snooper module 2050 that snoops the content of the packets 2020 being forwarded. The snooper 2050 keeps track of the states of each TCP connection in stateful tables 2041, 2042, and 2043. Among the state information being maintained is the MSS parameter of each TCP connection. Specifically, "MSS A" is the MSS of TCP connection A, "MSS B" is the MSS of TCP connection B. "MSS C" is the MSS of TCP connection C. The VM 1710 marks some of the packets 2020 as requiring TSO segmentation operation, and the MSS parameters of the corresponding TCP connections are passed to the TSO module 1740 along with the marked packets as metadata. The marked packets are then sent to the TSO module 1740 as packets 2030.

The marked packets 2030 forwarded by the VM 1710 reaches the TSO module 1740, which segments some or all of the packets according to the MSS parameter of the TCP connection that the packet belongs to. For example, the packet 2021 belongs to TCP connection A, and the TSO module 1740 would segment it according to MSS A (i.e., each segmented packet is less than or equal to MSS A).

Likewise, the packet 2022 would be segmented according to the MSS of connection B, and the packet 2023 would be segmented according to the MSS of connection C. In some embodiments, each packet requiring TSO segmentation would arrive at the TSO module 1740 with a metadata that indicates its MSS (i.e., the MSS of its TCP connection), and the TSO module 1740 then segments the packet based on the MSS embedded in the metadata of the packet. The segmented packets are then delivered to their destinations as packets 2040.

Figure 21:
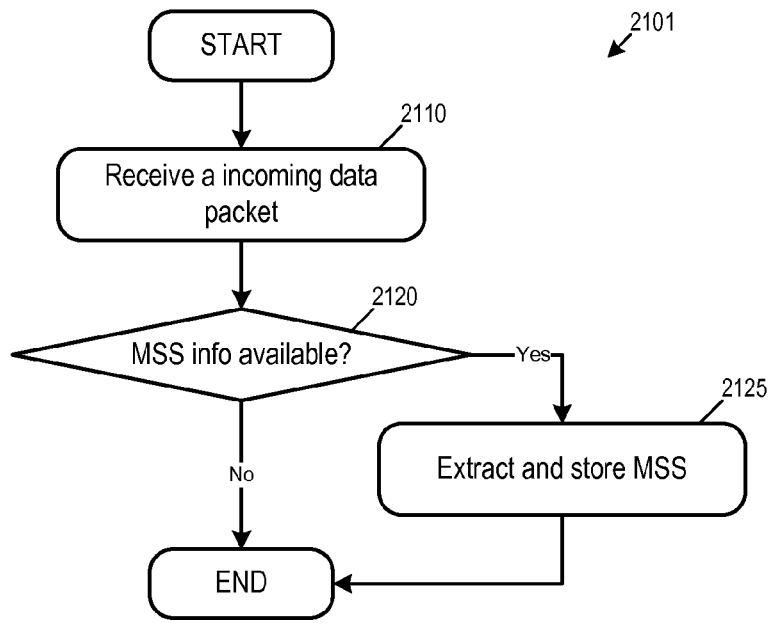
FIG. 21 conceptually illustrates a process for snooping MSS parameter and a process for performing segmentation on LRO aggregated packets based on the snooped MSS parameter.
Figure 21:
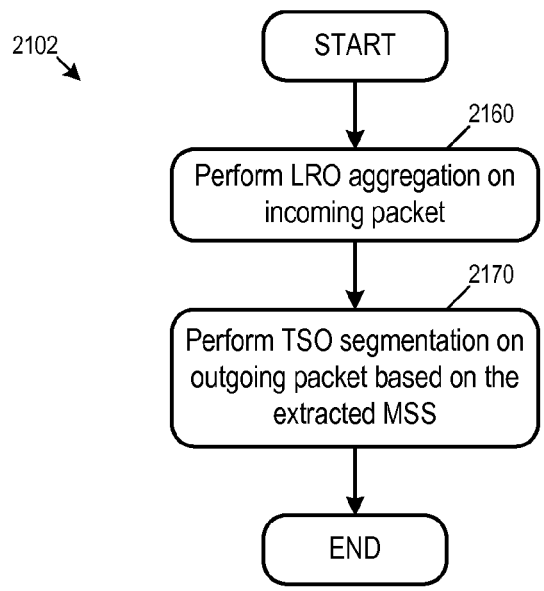

In some embodiments, FIG. 21 conceptually illustrates a process 2101 for snooping MSS parameter and a process 2102 for performing segmentation on LRO aggregated packets based on the snooped MSS parameter. The process 2102 uses the MSS parameter snooped by the process 2101 for performing segmentation. In some embodiments, the processes 2101 and 2102 are performed by a host machine having a PNIC. In some embodiments, the two processes are performed in the same host machine in parallel.

The process 2101 starts when it receives (at 2110) an incoming packet from a network. The process then determines (at 2120) if MSS information is available in the packet. In some embodiments, not all packets have TCP headers, and not all TCP headers specify MSS. Some embodiments examine the packet for a particular type of TCP header (e.g., syn/ack) to determine if MSS parameter is available. If MSS parameter is available, the process 2101 proceeds to 2125 to extract and store the MSS and ends. If MSS parameter is not available, the process 2101 ends. The MSS parameter, if extracted, is made available to process 2102.

The process 2102 starts whenever there are incoming packets from the network. The process 2102 performs (at 2160) LRO aggregation on the incoming packets. In some embodiments, this aggregation is enabled according to LRO aggregation rules such as five-tuple microflows as discussed above in Section II. The process then performs (at 2170) TSO segmentation on outgoing packets based on the extracted MSS. In some embodiments, an extracted MSS is specific to a TCP connection, and the process 2102 performs segmentation on a packet based on the MSS of the TCP connection that the packet belongs to. After performing segmentation on the aggregated packet, the process 2102 ends.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 22:
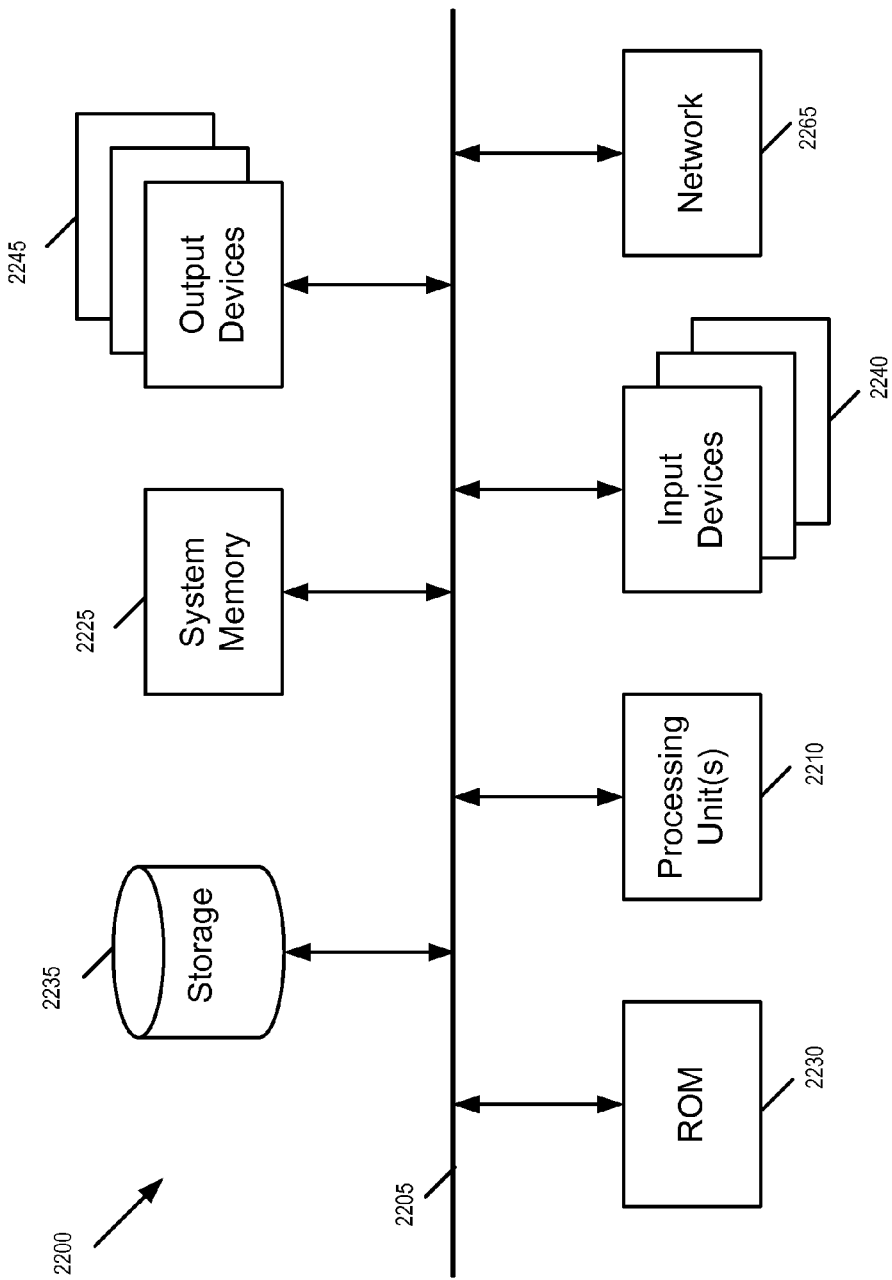
FIG. 22 conceptually illustrates an electronic system with which some embodiments of the invention are implemented.

FIG. 22 conceptually illustrates an electronic system 2200 with which some embodiments of the invention are implemented. The electronic system 2200 can be used to execute any of the control, virtualization, or operating system applications described above. The electronic system 2200 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2200 includes a bus 2205, processing unit(s) 2210, a system memory 2225, a read-only memory 2230, a permanent storage device 2235, input devices 2240, and output devices 2245.

The bus 2205 collectively represents all system, peripheral, and chipset buses that communicatively connect the numerous internal devices of the electronic system 2200. For instance, the bus 2205 communicatively connects the processing unit(s) 2210 with the read-only memory 2230, the system memory 2225, and the permanent storage device 2235.

From these various memory units, the processing unit(s) 2210 retrieves instructions to execute and data to process in order to execute the processes of the invention. The processing unit(s) may be a single processor or a multi-core processor in different embodiments.

The read-only-memory (ROM) 2230 stores static data and instructions that are needed by the processing unit(s) 2210 and other modules of the electronic system. The permanent storage device 2235, on the other hand, is a read-and-write memory device. This device is a non-volatile memory unit that stores instructions and data even when the electronic system 2200 is off. Some embodiments of the invention use a mass-storage device (such as a magnetic or optical disk and its corresponding disk drive) as the permanent storage device 2235.

Other embodiments use a removable storage device (such as a floppy disk, flash drive, etc.) as the permanent storage device. Like the permanent storage device 2235, the system memory 2225 is a read-and-write memory device. However, unlike storage device 2235, the system memory is a volatile read-and-write memory, such a random access memory. The system memory stores some of the instructions and data that the processor needs at runtime. In some embodiments, the invention's processes are stored in the system memory 2225, the permanent storage device 2235, and/or the read-only memory 2230. From these various memory units, the processing unit(s) 2210 retrieves instructions to execute and data to process in order to execute the processes of some embodiments.

The bus 2205 also connects to the input and output devices 2240 and 2245. The input devices enable the user to communicate information and select commands to the electronic system. The input devices 2240 include alphanumeric keyboards and pointing devices (also called "cursor control devices"). The output devices 2245 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 22, bus 2205 also couples electronic system 2200 to a network 2265 through a network adapter (not shown). In this manner, the computer can be a part of a network of computers (such as a local area network ("LAN"), a wide area network ("WAN"), or an Intranet, or a network of networks, such as the Internet. Any or all components of electronic system 2200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 2, 16, and 21) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A computing device serving as a host machine for a plurality of virtual machines, the computing device comprising:
 a physical network interface controller (PNIC), including at least a first queue and a second queue, wherein the first queue is associated with a first set of the plurality of the virtual machines, the second queue is associated with a second set of the plurality of the virtual machines, and the first queue and the second queue are associated with respective first rule and second rule in a set of rules that are specified by an application programming interface (API) for the PNIC; and
 wherein the PNIC is for receiving first data packets and second data packets from a network, for enabling packet aggregation at the first queue based on first header content of the first data packets and the first rule, and for disabling packet aggregation at the second queue based on second header content of the second data packets and the second rule; and
 a virtualization machine monitor (VMM) for forwarding aggregated first data packets from the first queue to the first set of the plurality of virtual machines and for forwarding non-aggregated second data packets from the second queue to the second set of the plurality of the virtual machines, wherein the VMM uses the API for the PNIC to specify the set of rules.

2. The computing device of claim 1, wherein the VMM uses the API to specify the first rule for the first queue and the second rule for the second queue.

3. The computing device of claim 1, wherein the set of rules comprises the first rule for filtering the first data packets based on the first header content and enabling a packet aggregation operation on the first data packets at the first queue.

4. The computing device of claim 3, wherein the set of rules further comprises the second rule for filtering the second data packets based on the second header content and disabling a packet aggregation operation on the second data packets at the second queue.

5. The computing device of claim 1, wherein the set of rules comprises the first rule to activate a packet aggregation operation on the first data packets destined for a particular virtual machine from the first set of the plurality of the virtual machines.

6. The computing device of claim 1, wherein the set of rules comprises the first rule to enable a packet aggregation operation on the first data packets that belongs to a particular connection session.

7. The computing device of claim 1, wherein the set of rules comprises the first rule to enable packet aggregation operation at the first queue when a set of criteria is met.

8. The computing device of claim 7, wherein the set of criteria comprise a protocol identifier, a source IP address, a destination IP address, a source transport identifier, and a destination transport identifier.

9. A computing device serving as host machine for a plurality of virtual machines, the computing device comprising a set of processing units and a computer readable medium storing a computer program, the computer program executing on one or more processing units, said computer program comprising sets of instructions for:
 providing a set of packet aggregation rules to a physical network interface controller (PNIC), the PNIC comprising a plurality of queues for providing data received from a network to the plurality of virtual machines, wherein a first queue from the plurality of queues is associated with a first virtual machine, a second queue from the plurality of queues is associated with a second virtual machine, a first rule in the set of packet aggregation rules is for enabling packet aggregation at the first queue based on first header content of first data packets from the network, and a second rule in the set of packet aggregation rules is for disabling packet aggregation at the second queue based on second header content of second data packets from the network; and forwarding aggregated first data packets from the first queue in the PNIC to the first virtual machine and non-aggregated second data packets from the second queue in the PNIC to the second virtual machine.

10. The computing device of claim 9 further comprising receiving the set of packet aggregation rules from a controller for the network.

11. The computing device of claim 9, wherein the set of packet aggregation rules comprises the first rule for filtering the first data packets based on the first header content and enabling a packet aggregation operation on the first data packets at the first queue.

12. The computing device of claim 11, wherein the set of packet aggregation rules further comprises the second rule for filtering the second data packets based on the second header content and disabling a packet aggregation operation on the second data packets at the second queue.

13. The computing device of claim 9, wherein the first virtual machine consumes the aggregated first data packets and the second virtual machine forwards the non-aggregated second data packets to another node in the network.

14. The computing device of claim 13, wherein the second virtual machine is a router.

15. The computing device of claim 9, wherein the set of packet aggregation rules comprises the first rule to activate a packet aggregation operation on the first data packets destined for the first virtual machine.

16. The computing device of claim 15, wherein the first rule to enable the packet aggregation operation on the first data packets destined for the first virtual machine, wherein the first header content specifies a destination media access control (MAC) address of the first virtual machine.

17. The computing device of claim 15, wherein the first rule to enable the packet aggregation operation on the first data packets destined for the first virtual machine, wherein the first header content specifies a destination internet protocol (IP) address of the first virtual machine.

18. The computing device of claim 9, wherein the set of packet aggregation rules comprises the first rule to enable a packet aggregation operation on the first data packets that belong to a particular connection session.

19. The computing device of claim 9, wherein the set of packet aggregation rules comprises the first rule to enable a packet aggregation operation at the first queue when a set of criteria is met.

20. The computing device of claim 19, wherein the set of criteria comprise a protocol identifier, a source IP address, a destination IP address, a source transport identifier, and a destination transport identifier.

21. A non-transitory computer readable storage medium storing a program for execution on one or more processors, the program comprising sets of instructions for:

operating a plurality of virtual machines;

setting a plurality of packet aggregation rules for a plurality of queues in a physical network interface controller (PNIC) by using an application programming interface (API) of the PNIC, wherein a first queue from the plurality of queues is associated with a first virtual machine, a second queue from the plurality of queues is associated with a second virtual machine, a first rule of the plurality of packet aggregation rules is for enabling packet aggregation at the first queue based on first header content of first data packets from the network, and a second rule of the plurality of packet aggregation rules is for disabling packet aggregation at the second queue based on second header content of second data packets from the network; and retrieving aggregated first data packets from the first queue and non-aggregated second data packets from the second queue.

22. The non-transitory computer readable storage medium of claim 21, wherein the program further comprises a set of instruction for operating a plurality of network stacks, wherein a particular network stack for a particular virtual machine receives an interrupt from the API of the PNIC when an aggregated packet is ready to be retrieved from a particular queue.

23. The non-transitory computer readable storage medium of claim 21, wherein the first rule specifies that a particular first data packet is to be aggregated if the particular first data packet is destined for the first virtual machine.

24. The non-transitory computer readable storage medium of claim 21, wherein the first rule specifies that a particular first data packet is to be aggregated if the particular first data packet belongs to a particular connection session.

25. The non-transitory computer readable storage medium of claim 24, wherein the particular connection session is specified by a set of parameters comprising a protocol identifier, a source IP address, a destination IP address, a source transport identifier, and a destination transport identifier.

26. The non-transitory computer readable storage medium of claim 25, wherein at least one of the parameters in the set of parameters is specified as a wildcard.

27. A method for operating a host machine in a virtualized network environment, the host machine hosting a plurality of virtual machines, the method comprising:

identifying a first queue in a physical network interface controller (PNIC) that is buffering first data packets received by the PNIC from a network and destined for a first virtual machine that consumes first data packets;

identifying a second queue in the PNIC that is buffering second data packets received by the PNIC from the network and destined for a second virtual machine that forwards second data packets;

enabling packet aggregation on the first data packets in the first queue based on first header content of the first data packets and a first packet aggregation rule; and disabling packet aggregation on the second data packets in the second queue based on second header content of the second data packets and of second packet aggregation rule.

28. The method of claim 27, wherein enabling packet aggregation in the first queue comprises setting the first packet aggregation rule for the first queue, wherein disabling packet aggregation in the second queue comprises setting the second packet aggregation rule for the second queue.

* * * * *